(12) United States Patent
Kariyada

(10) Patent No.: US 7,494,700 B2
(45) Date of Patent: Feb. 24, 2009

(54) OPTICAL INFORMATION RECORDING MEDIUM AND METHOD OF MANUFACTURING THE SAME

(75) Inventor: Eiji Kariyada, Tokyo (JP)

(73) Assignee: NEC Corporation (JP)

( * ) Notice: Subject to any disclaimer, the term of this patent is extended or adjusted under 35 U.S.C. 154(b) by 484 days.

(21) Appl. No.: 11/071,725

(22) Filed: Mar. 3, 2005

(65) Prior Publication Data
US 2005/0196575 A1 Sep. 8, 2005

(30) Foreign Application Priority Data
Mar. 3, 2004 (JP) ............................. 2004-059740

(51) Int. Cl.
B32B 3/02 (2006.01)
(52) U.S. Cl. ................. 428/64.1; 428/64.4; 430/270.11
(58) Field of Classification Search ................ 428/64.1, 428/64.4, 64.5, 64.6; 430/270.13, 270.11
See application file for complete search history.

(56) References Cited

U.S. PATENT DOCUMENTS

| 4,680,742 | A | 7/1987 | Yamada et al. | |
|---|---|---|---|---|
| 4,743,502 | A | 5/1988 | Yoshitomi et al. | |
| 5,417,827 | A | 5/1995 | Finley | |
| 6,449,239 | B1* | 9/2002 | Uno et al. | 369/275.1 |
| 6,503,690 | B1* | 1/2003 | Uno et al. | 430/270.13 |
| 6,599,604 | B2* | 11/2004 | Uno et al. | 428/64.1 |
| 6,821,707 | B2* | 11/2004 | Uno et al. | 430/270.13 |
| 7,169,533 | B2* | 1/2007 | Sakaue et al. | 430/270.13 |
| 2004/0252622 | A1* | 12/2004 | Kariyada | 369/275.2 |
| 2007/0072402 | A1* | 3/2007 | Lee et al. | 438/585 |

FOREIGN PATENT DOCUMENTS

CN 1474390 A 2/2004

(Continued)

OTHER PUBLICATIONS

"The Age of Phase Change optical Recording: Proceedings of the 15th Symposium on Phase Change Optical Information Storage" dated Oct. 30-31, 2003.

(Continued)

Primary Examiner—Elizabeth Mulvaeny
(74) Attorney, Agent, or Firm—Ostrolenk,Faber, Gerb & Soffen, LLP

(57) ABSTRACT

An optical information recording medium includes an oxide/nitride dielectric film that shows a film forming rate higher than that of SiON film and hence is adapted to mass production. The recording medium shows little change in the reflectivity after a long environment test. A first dielectric layer made of ZnS—$SiO_2$, an oxide/nitride dielectric layer made of silicon-nickel oxide/nitride, a second dielectric layer made of ZnS—$SiO_2$, a first interface layer made of GeN, a recording layer made of $Ge_2Sb_2Te_5$, a second interface layer made of GeN, a third dielectric layer made of ZnS—$SiO_2$ and a reflection layer are laid sequentially on a transparent substrate in the above mentioned order. The oxide/nitride dielectric layer is formed by reactive sputtering in a mixed gas atmosphere containing Ar gas, $O_2$ gas and $N_2$ gas. The refractive index of the oxide/nitride dielectric layer is made lower than that of the first dielectric layer and that of the second dielectric layer and the light absorption coefficient of the recording layer is made lower in an amorphous state than in a crystalline state.

19 Claims, 8 Drawing Sheets

FOREIGN PATENT DOCUMENTS

| | | |
|---|---|---|
| EP | 0 352 748 A2 | 1/1990 |
| EP | 391 423 | 4/1990 |
| EP | 0 391 423 A2 | 10/1990 |
| EP | 0 684 601 A1 | 5/1995 |
| JP | 62-192944 | 8/1987 |
| JP | 63-13146 | 1/1988 |
| JP | 2-108259 | 4/1990 |
| JP | 2-223033 | 9/1990 |
| JP | 2-260253 | 10/1990 |
| JP | 3-8137 | 1/1991 |
| JP | 4-335222 | 11/1992 |
| JP | 8-69645 | 3/1996 |
| JP | 2000-090491 | 3/2000 |
| JP | 2000-105946 | 4/2000 |
| JP | 2000-222789 | 8/2000 |
| JP | 2001-105946 | 4/2001 |
| JP | 2002-312978 | 10/2002 |
| JP | 2003-173569 | 6/2003 |
| NL | 8901689 | 7/1989 |

OTHER PUBLICATIONS

Search Report issued by European Patent Office on Sep. 28, 2005 in connection with corresponding European Patent application No. EP 05 00 4558.

English translation of Abstract for Application No. 61227424 filed Sep. 1986.

English translation of Abstract for application No. 01085271 filed Apr. 1989.

English translation of Abstract for application No. 11203725 filed Jul. 1999.

English translation of Abstract for JP2002-735861; XP-002344505; Jun. 2002.

English translation of Abstract for application No. 11298794 filed Jun. 1998.

Office action issued by European Patent Office on Jul. 21, 2006 in connection with corresponding European application No. EP 05 004 558.2-2210.

Office Action issued by Chinese Patent Office on Sep. 8, 2006 in connection with corresponding Chinese application No. 200510052684.0.

English translation of Chinese Office Action issued in connection with corresponding Chinese application No. 200510052684.0 on Sep. 8, 2006.

Office Action issued by the Japanese Patent Office on Oct. 2, 2007 in connection with corresponding Japanese Patent Application No. 2004-059740.

Translation of the Office Action issued by Japanese Patent Office on Oct. 2, 2007 in connection with corresponding Japanese Patent Applicaiton No. 2004-059740.

Office Action issued by the Japanese Patent Office on Apr. 15, 2008 in connection with corresponding Japanese Patent Application No. 2004-059740.

Translation of the Office Action issued by Japanese Patent Office on Apr. 15, 2008 in connection with corresponding Japanese Patent Application No. 2004-059740.

* cited by examiner

OPTICAL INFORMATION RECORDING MEDIUM AND METHOD OF MANUFACTURING THE SAME

BACKGROUND OF THE INVENTION

1. Field of the Invention

This invention relates to an optical information recording medium adapted to be irradiated with a laser beam in order to record information by means of a rewritable optical information recording/reproduction apparatus and to a method of manufacturing the recording medium. More particularly, it relates to a phase change type optical disk medium adapted to record information by bringing the phase state of its recording layer into either an amorphous state or a crystalline state and reproduce information by utilizing the optical characteristics of the recording layer that differ between the phase states and to a method of manufacturing the disk medium.

2. Description of Related Art

Optical information recording/reproduction employing a laser beam has been and is utilized for large capacity memories in various fields because the optical head for optical information recording/reproduction can be made as an access to a recording medium very fast and in non-contact therewith, and record a large volume of information to or reproduce a large volume of information from the medium. Optical information recording mediums that can be used for optical information recording/reproduction are classified into the reproduction-only type such as compact disks and laser disks from which the user can only reproduce data, the write-once type on which the user can record additional data and the rewritable type on which the user can record and from which the user can erase data repeatedly for rewriting. The write-once type and trewritable type optical information recording mediums are being used as external memories of computers and mediums for storing document files and image files.

The rewritable optical information recording mediums include phase change type optical disks that utilize phase changes of a recording film and magneto-optical disks that utilize changes of the direction of magnetization of a vertically magnetized film. Of these, the phase change type optical disks are expected to be in the main stream of rewritable type optical information recording mediums because, unlike magneto-optical disks, information can be recorded on them without requiring an external magnetic field and overwritten with ease.

In conventional phase change type optical disks, the value selected for the light absorption coefficient Aa of the recording layer in the amorphous state is generally higher than the value selected for the light absorption coefficient Ac of the layer in the crystalline state. Therefore, as the pitch of arrangement of recording tracks of a phase change type optical disk medium is made narrower in order to increase the recording density, the recording marks arranged at adjacently located recording tracks where information is already recorded and that are in the amorphous state, showing a high light absorption coefficient, absorb the laser beam at a high rate. Then, as a result, the temperature of the recording marks in the amorphous state rises to crystallize the recording marks and consequently erase the information recorded on the recording marks. In other words, cross erasures take place there.

This problem can be effectively prevented from occurring by setting a value for the light absorption coefficient Aa of the recording layer in the amorphous state lower than the value for the light absorption coefficient Ac of the layer in the crystalline state. A technique of making Aa lower than Ac has already been proposed. According to this technique, a first dielectric layer, a second dielectric layer, a third dielectric layer, a first interface layer, a recording layer, a second interface layer, a fourth dielectric layer and a reflection layer are sequentially laid and the refractive index n2 of the second dielectric layer and the refractive index n3 of the third dielectric layer are made to show a relationship of n2<n3, while the refractive index n1 of the first dielectric layer and the refractive index n2 of the second dielectric layer are made to show a relationship of n2<n1. More specifically, ZnS—SiO$_2$ films showing a refractive index of about 2.3 are used for the first and third dielectric layers of the above dielectric layers, and an SiO$_2$ film showing a refractive index of about 1.5 or an Al$_2$O$_3$ film showing a refractive index of about 1.7 is used for the second dielectric layer as general practice. Alternatively, an SiN film showing a refractive index of about 1.9 may be used for the second dielectric layer depending on the situation where the recording medium is used (see, inter alia, JP-A-2000-90491 and 2000-105946).

When SiO$_2$ film or Al$_2$O$_3$ film is used for the second dielectric layer, generally an SiO$_2$ target or an Al$_2$O$_3$ target is used for the film forming process. However, it has been pointed out that the film forming rate of the process is low and hence such a process is not suitable for mass production. When, on the other hand, an SiN film showing a refractive index of about 1.9 is used for the second dielectric layer, the above described fourth dielectric layer inevitably needs to be made relatively thick in order to meet the requirement of Aa<Ac. Thus, it has also been pointed out that the repeat O/W resistance of the recording medium can be degraded.

In an attempt of solving the above-identified problems, a technique of forming an SiON film in a mixed gas atmosphere of argon gas, oxygen gas and nitrogen gas, using an Si target, has been proposed to replace the above described SiO$_2$, Al$_2$O$_3$ or SiN film. It has been reported that a higher film forming rate can be achieved and dielectric film showing a relatively low refractive index can be produced when such SiON film is used in place of SiO$_2$, Al$_2$O$_3$ or SiN film. The use of such a film is advantageous in terms of mass production and repeat O/W resistance (see, inter alia, Proceedings of the 15$^{th}$ Symposium on Phase Change Optical Information Storage PC0S2003, pp. 56-61 (2003)).

However, the above-described known technique is accompanied by the following problems. As pointed out above, the SiON film that is formed in the mixed gas atmosphere of argon gas, oxygen gas and nitrogen gas, using the Si target, provides a film forming rate about three times as high as the film forming rate of the conventional process for producing an SiO$_2$ or Al$_2$O$_3$ film but considerably lower than the film forming rate of the process of forming ZnS—SiO$_2$ film, which is popularly used for phase change recording mediums. More specifically, the film forming rate of forming the SiON film is about two-thirds that of forming the ZnS—SiO$_2$ film. Thus, the problem remains unsolved that the productivity is not satisfactory due to the unbalanced film forming rates when the SiON film acting as the dielectric layer is sandwiched between upper and lower ZnS—SiO$_2$ films.

On the other hand, in the case of recording mediums realized by using SiON film that is formed in a mixed gas atmosphere of argon gas, oxygen gas and nitrogen gas, using an Si target, it has been known that the reflectivity of the medium may change before and after an environment test and falls after the environment test if the medium is held in a high temperature/high humidity condition. Generally, it is desired that the reflectivity of the recording medium does not change before and after the environment test. In other words, the instability of reflectivity may become a problem when the recording medium is used for a long period of time.

SUMMARY OF THE INVENTION

In view of the above identified problem, it is therefore an object of the present invention to provide an optical information recording medium including at least one oxide/nitride dielectric layer arranged between a laser beam receiving side substrate and an information recording layer, in which the oxide/nitride dielectric film shows a film forming rate higher than the film forming rate of SiON film and which is adapted to mass production and shows little change in the reflectivity after a long environment test, and as a method of manufacturing such a medium.

The term oxide/nitride, as used above and throughout the instant specification is clearly meant to designate "oxynitride".

A first aspect of the present invention provides an optical information recording medium including a substrate and an oxide/nitride dielectric layer and an information recording layer overlying the substrate; and the oxide/nitride dielectric layer is made of an Si-based oxide/nitride containing Si as a principal ingredient and at least one element selected from the group consisting of Ni, Ti, Cr, Co, Ta, Cu and C as an auxiliary ingredient added to the principal ingredient. In the recording medium, the Si-based oxide/nitride contains oxygen by 39 to 67.5 at. %. The oxide/nitride dielectric layer has a refractive index from 1.43 to 1.8.

A second aspect of the present invention provides an optical information recording medium including a substrate and an oxide/nitride dielectric layer and an information recording layer overlying the substrate; and the oxide/nitride dielectric layer is made of an Al-based oxide/nitride containing Al as a principal ingredient and at least one element selected from the group consisting of Ni, Ti, Cr, Co, Ta, Cu and C as an auxiliary ingredient added to the principal ingredient. In the recording medium, the Al-based oxide/nitride contains oxygen by 35 to 67.5 at. %. The oxide/nitride dielectric layer has a refractive index from 1.5 to 1.8.

A third aspect of the present invention provides an optical information recording medium including a substrate and an oxide/nitride dielectric layer and an information recording layer overlying the substrate; and the oxide/nitride dielectric layer is made of an AlSi-based oxide/nitride containing Al and Si as principal ingredients and at least one element selected from the group consisting of Ni, Ti, Cr, Co, Ta, Cu and C as an auxiliary ingredient added to the principal ingredient. In the recording medium, the AlSi-based oxide/nitride contains oxygen by 39 to 67.5 at. %. The oxide/nitride dielectric layer has a refractive index from 1.43 to 1.8.

A fourth aspect of the present invention provides a method of manufacturing an optical information recording medium including the steps of forming an oxide/nitride dielectric layer overlying a substrate by reactive sputtering in a mixed gas atmosphere containing argon gas, oxygen gas and nitrogen gas; and forming an information recording layer, wherein the reactive sputtering employs a target made of an Si-based oxide/nitride containing Si as a principal ingredient and at least one element selected from the group consisting of Ni, Ti, Cr, Co, Ta, Cu and C as an auxiliary ingredient added to the principal ingredient.

A fifth aspect of the present invention provides a method of manufacturing an optical information recording medium including the steps of forming an oxide/nitride dielectric layer overlying a substrate by reactive sputtering in a mixed gas atmosphere containing argon gas, oxygen gas and nitrogen gas; and forming thereon an information recording layer, wherein the reactive sputtering employs a target made of an Al-based oxide/nitride containing Al as a principal ingredient and at least one element selected from the group consisting of Ni, Ti, Cr; Co, Ta, Cu and C as an auxiliary ingredient added to the principal ingredient.

A six aspect of the present invention provides a method of manufacturing an optical information recording medium including the steps of forming an oxide/nitride dielectric layer overlying a substrate by reactive sputtering in a mixed gas atmosphere containing argon gas, oxygen gas and nitrogen gas; and forming an information recording layer, wherein the reactive sputtering employs a target made of an AlSi-based oxide/nitride containing Al and Si as principal ingredients and at least one element selected from the group consisting of Ni, Ti, Cr, Co, Ta, Cu and C as an auxiliary ingredient added to the principal ingredient.

A seventh aspect of the present invention provides a method of manufacturing an optical information recording medium including the steps of forming at least one reflection layer overlying a substrate, forming at least one first dielectric layer overlying the reflection layer, forming an information recording layer overlying the first dielectric layer, forming at least one second dielectric layer overlying the information recording layer, forming an oxide/nitride dielectric layer by reactive sputtering in a mixed gas atmosphere containing argon gas, oxygen gas and nitrogen gas; and forming at least one third dielectric layer; wherein the reactive sputtering employing a target containing Si as a principal ingredient and at least one element selected from the group consisting of Ni, Ti, Cr, Co, Ta, Cu and C as an auxiliary ingredient added to the principal ingredient.

An eighth aspect of the present invention provides a method of manufacturing an optical information recording medium including the steps of forming at least one reflection layer overlying a substrate, forming at least one first dielectric layer overlying the reflection layer, forming an information recording layer overlying the first dielectric layer, forming at least one second dielectric layer overlying the information recording layer, forming an oxide/nitride dielectric layer by reactive sputtering in a mixed gas atmosphere containing argon gas, oxygen gas and nitrogen gas; and forming at least one third dielectric layer; wherein the reactive sputtering employing a target containing Al as a principal ingredient and at least one element selected from the group consisting of Ni, Ti, Cr, Co, Ta, Cu and C as an auxiliary ingredient added to the principal ingredient.

A ninth aspect of the present invention provides a method of manufacturing an optical information recording medium including the steps of forming at least one reflection layer overlying a substrate, forming at least one first dielectric layer overlying the reflection layer, forming an information recording layer overlying the first dielectric layer, forming at least one second dielectric layer overlying the information recording layer, forming an oxide/nitride dielectric layer by reactive sputtering in a mixed gas atmosphere containing argon gas, oxygen gas and nitrogen gas; and forming at least one third dielectric layer; wherein the reactive sputtering employing a target containing Al and Si as principal ingredients and at least one element selected from the group consisting of Ni, Ti, Cr, Co, Ta, Cu and C as an auxiliary ingredient added to the principal ingredients.

Thus, according to the invention, it is possible to efficiently form the oxide/nitride dielectric layer showing the refractive index substantially equal to that of $SiO_2$ film or SiON film and providing a film forming rate not smaller than twice of the film forming rate of SiON film in an atmosphere containing argon gas, oxygen gas and nitrogen gas, using a target made of an alloy containing Si, Al or AlSi as a principal ingredient, to which at least one element selected from the group consisting of Ni, Ti, Cr, Co, Ta, Cu and C is added, by means of reactive sputtering. Then, it is possible to manufacture optical information recording mediums with a high productivity. Additionally, according to the invention, it is possible to provide the optical information recording medium that shows little change with time in the reflectivity of the medium and the excellent reliability.

DETAILED DESCRIPTION OF THE PREFERRED EMBODIMENTS

Now, the present invention will be described in greater detail by referring to the accompanying drawings that illustrate preferred embodiments of the invention. Firstly, a first embodiment of the present invention will be described.

Figure 1:
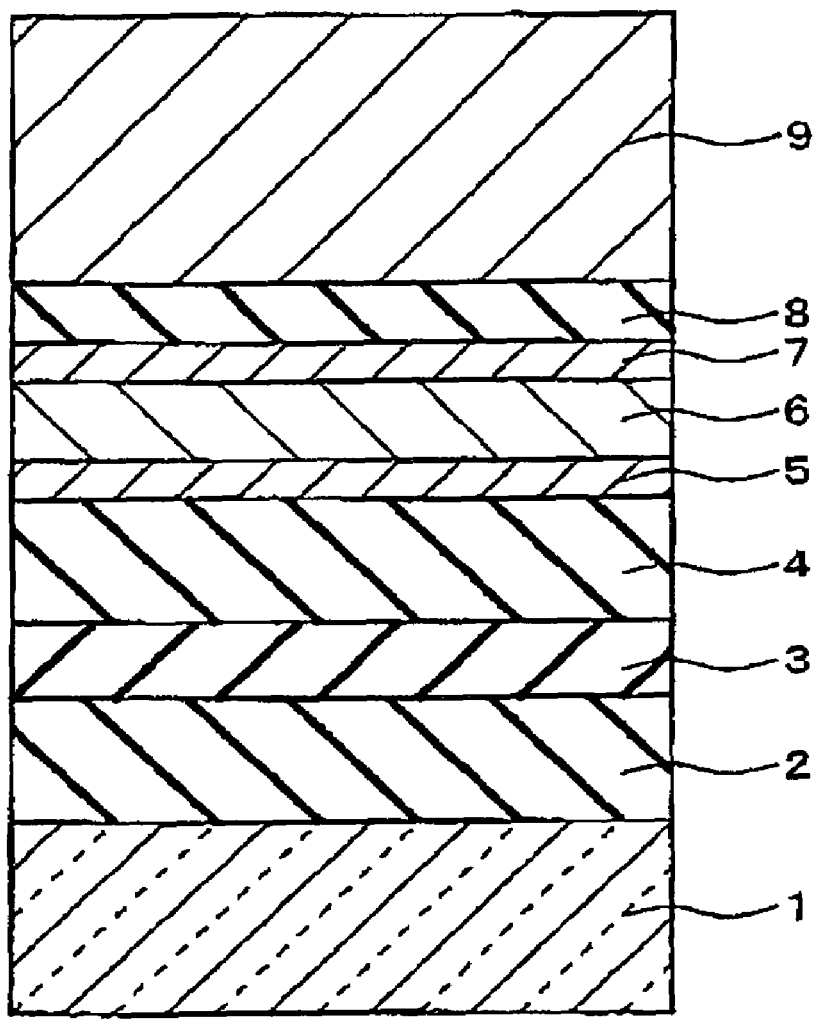
FIG. 1 is a schematic cross sectional view of an optical disk in accordance with the first embodiment of the invention.

FIG. 1 is a schematic cross sectional view of the first embodiment of an optical information recording medium according to the invention, which is an optical disk. The optical disk is a rewritable phase change type optical disk, which may typically be a DVD (digital versatile disk).

As shown in FIG. 1, the optical disk of this embodiment is formed by sequentially laying a first dielectric layer 2, an oxide/nitride dielectric layer 3, a second dielectric layer 4, a first interface layer 5, an information recording layer 6, a second interface layer 7, a third dielectric layer 8 and a reflection layer 9 on a transparent substrate 1 in the above mentioned order. Another transparent substrate (not shown) is bonded onto the reflection layer 9.

The transparent substrate 1 is typically made of plastic, resin or glass and has a thickness of 0.6 mm, for example. Meandering lands and grooves are formed alternately on the transparent substrate 1 substantially at identical cycles to produce recording tracks. Additionally, wobble modulation type format-modulated sections are formed on the transparent substrate 1 by modulating the meanders of the grooves of the recording tracks. The format-modulated sections of adjacent recording tracks are arranged so as not to interfere with each other in radial directions.

The first dielectric layer 2, the second dielectric layer 4 and the third dielectric layer 8 are typically made of $ZnS$—$SiO_2$. The oxide/nitride dielectric layer 3 is typically made of silicon-nickel oxide/nitride (SiNiON). The silicon-nickel oxide/nitride film of the oxide/nitride dielectric layer 2 is formed by reactive sputtering and its oxygen concentration is typically between 39 and 67.5 at. %. Typically, the first interface layer 5 and the second interface layer 7 are made of GeN and the information recording layer 6 is made of $Ge_2Sb_2Te_5$, for example. The reflection layer 9 is typically made of AlTi. The other transparent substrate (not shown) typically has a thickness of 0.6 mm.

The light absorption coefficient Aa of the recording layer 6 in the amorphous state is lower than the light absorption coefficient Ac in the crystalline state. The following values are selected for the refractive indexes of the layers in order to realize Aa<Ac. The refractive index of the transparent substrate 1 typically made of plastic, resin or glass is generally between 1.5 and 1.6. Thus, the refractive index of the first dielectric layer 2 has to be made higher than that of the transparent substrate 1 because the first dielectric layer 2 and the transparent substrate 1 are optically equivalent and the above requirement of Aa<Ac is not satisfied if the refractive index n1 of the first dielectric layer 2 is substantially equal to the refractive index n0 of the transparent substrate 1. Additionally, the first dielectric layer 2 needs to adhere well to the transparent substrate 1. Taking these into consideration, the first dielectric layer 2, the second dielectric layer 4 and the third dielectric layer 8 are made of $ZnS$—$SiO_2$. The refractive index of $ZnS$—$SiO_2$ is about 2.35. At least one element selected from a group of elements of Ni, Ti, Cr, Co, Ta, Cu and C is added to the oxide/nitride dielectric layer 2 typically made of silicon-nickel oxide/nitride preferably at a rate of 0.2 to 10 at. %.

The refractive index of the silicon-nickel oxide/nitride film of the oxide/nitride dielectric layer 3 is approximately between 1.43 and 1.8. Thus, the refractive index n2 of the oxide/nitride dielectric layer 3 and the refractive index n3 of the second dielectric layer 4 show a relationship of n2<n3, while the refractive index n1 of the first dielectric layer 2 and the refractive index n2 of the oxide/nitride dielectric layer 3 show a relationship of n1>n2. Thus, it is possible to make the light absorption coefficient Aa of the recording layer 6 in the amorphous state lower than the light absorption coefficient Ac in the crystalline state.

As will be described hereinafter, the refractive index of the silicon-nickel oxide/nitride film of the oxide/nitride dielectric layer 3 is high if the oxygen concentration of the silicon-nickel oxide/nitride film is lower than 39 at. %. Then, the third dielectric film 8 has to be made relatively thick in order to satisfy the requirement of Aa<Ac. A relatively thick third dielectric film 8 can by turn degrade the signal quality if the optical disk is repeatedly used for signal recording/reproduction. If, on the other hand, the silicon-nickel oxide/nitride film is formed to show an oxygen concentration exceeding 67.5 at. %, the film forming rate falls to reduce the film forming productivity. Thus, the oxygen concentration of the silicon-nickel oxide/nitride film is typically between 39 and 67.5 at. %.

Now, the operation of the optical disk of this embodiment having the above-described configuration will be described below. Firstly, the operation of recording information on the optical disk will be described. In the initial state, all the region of the recording layer 6 is in the crystalline state. Then, a laser beam is irradiated onto the transparent substrate 1 from below. The laser beam passes through the transparent substrate 1, the first dielectric layer 2, the oxide/nitride dielectric layer 3, the second dielectric layer 4 and the first interface layer 5 and reaches the recording layer 6. The laser beam that reaches the recording layer 6 passes through the second interface layer 7 and the third dielectric layer 8 and is reflected by the reflection layer 9. Then, the laser beam passes through the third dielectric layer 8 and the second dielectric layer 7 and reaches the recording layer 6 once again. As a result, the recording spot of the recording layer 6 is heated to show a temperature higher than the melting point of the recording layer 6 and becomes molten. Consequently, the recording spot becomes amorphous when it is solidified to record information there.

When reading some or all of the information recorded on the optical disk, a laser beam is irradiated onto the recording layer 6 and the difference in the reflectivity of different recording spots of the recording layer 6 is detected. More specifically, the reflectivity of the recording layer 6 is higher in the amorphous state than in the crystalline state so that it is possible to read some or all of the information recorded on the optical disk by detecting the difference, in the reflectivity. When erasing some or all of the information recorded on the optical disk, the recording spot of the recording layer 6 in question is heated to a temperature higher than the crystallizing temperature and lower than the melting point of the recording layer 6 by irradiating a laser beam. Then, as a result, the recording spot of the recording layer 6 is crystallized and the information recorded there is erased.

With this embodiment, it possible to obtain a high quality silicon-nickel oxide/nitride film at a film forming rate twice as high as conventional SiON films and effectively prevent degradation of film density by reactive sputtering for the oxide/nitride dielectric layer 3. As a result, it is possible to accurately reproduce the information recorded on an optical disk without any significant change in the reflectivity if the recorded data are held for a long period of time.

Now, a second embodiment of the invention will be described below. This embodiment differs from the above-described first embodiment in that an aluminum-nickel oxide/nitride film (AlNiON) that is produced by reactive sputtering is used for the oxide/nitride dielectric layer 3 (see FIG. 1). The oxygen concentration of the aluminum-nickel oxide/nitride film is typically between 35 and 67.5 at. %. As will be described hereinafter, the refractive index of the aluminum-nickel oxide/nitride film of the oxide/nitride dielectric layer 3 is high when the oxygen concentration of the aluminum-nickel oxide/nitride film is lower than 35 at. %. Then, the third dielectric film 8 has to be made relatively thick in order to satisfy the requirement of Aa<Ac. A relatively thick third dielectric film 8 can by turn degrade the signal quality when the optical disk is repeatedly used for signal recording/reproduction. If, on the other hand, the aluminum-nickel oxide/nitride film is formed to show an oxygen concentration exceeding 67.5 at. %, the film forming rate falls to reduce the film forming productivity. Thus, the oxygen concentration of the aluminum-nickel oxide/nitride film is typically between 35 and 65.5 at. %. The configuration, the operation and the advantages of this embodiment other than above are identical with those of the first embodiment.

Now, a third embodiment of the invention will be described below. This embodiment differs from the above-described first embodiment in that an aluminum-silicon-nickel oxide/nitride film (AlSiNiON) that is produced by reactive sputtering is used for the oxide/nitride dielectric layer 3 (see FIG. 1). The oxygen concentration of the aluminum-silicon-nickel oxide/nitride film is typically between 39 and 67.5 at. %. As will be described hereinafter, the refractive index of the aluminum-silicon-nickel oxide/nitride film of the oxide/nitride dielectric layer 3 is high when the oxygen concentration of the aluminum-silicon-nickel oxide/nitride film is lower than 39 at. %. Then, the third dielectric film 8 has to be made relatively thick in order to satisfy the requirement of Aa<Ac. A relatively thick third dielectric film 8 can by turn degrade the signal quality when the optical disk is repeatedly used for signal recording/reproduction. When, on the other hand, the aluminum-silicon-nickel oxide/nitride film is formed to show an oxygen concentration exceeding 67.5 at. %, the film forming rate falls to reduce the film forming productivity. Thus, the oxygen concentration of the aluminum-silicon-nickel oxide/nitride film is typically between 39 and 67.5 at. %. The configuration, the operation and the advantages of this embodiment other than above are identical with those of the first embodiment.

Now, a fourth embodiment of the invention will be described below. This is an embodiment of method of manufacturing the optical information recording medium (optical disk) as described above for the first embodiment. As shown in FIG. 1, the first dielectric layer 2, the oxide/nitride dielectric layer 3, the second dielectric layer 4, the first interface layer 5, the recording layer 6, the second interface layer 7, the third dielectric layer 8 and the reflection layer 9 are formed sequentially on the transparent substrate 1 having guide grooves (not shown) for guiding a laser beam by means of an inline type sputtering system, following the procedure as described below. In the inline type sputtering system, the distance between the target and the substrate is typically 15 cm.

Firstly, a sputtering operation is conducted, using a ZnS—SiO$_2$ target in an Ar gas atmosphere typically under pressure of 0.1 Pa with a power density of 2.2 W/cm$^2$, for example, to form a ZnS—SiO$_2$ film to a thickness of 35 nm, for example, as the first dielectric layer 2 on the transparent substrate 1.

Then, a reactive sputtering operation is conducted, using an Si$_{99}$Ni$_1$ target (at. %) in a mixed gas atmosphere of Ar gas, N$_2$ gas and O$_2$ gas typically under pressure of 0.2 Pa with a power density of 2.5 W/cm$^2$, for example, to form a silicon-nickel oxide/nitride film to a thickness of 40 nm, for example, as the oxide/nitride dielectric layer 3 on the first dielectric layer 2. The mixed gas that is used for the reactive sputtering operation has a composition within a hexagon defined by (90, 9, 1) volume %, (80, 12, 8) volume %, (70, 12, 8) volume %, (70, 2, 28) volume %, (80, 3, 17) volume % and (90, 7, 3) volume % in terms of (Ar, O, N) volume %.

Thereafter, a sputtering operation is conducted, using a ZnS—SiO$_2$ target in an Ar gas atmosphere typically under pressure of 0.1 Pa with a power density of 2.2 W/cm$^2$, for example, to form a ZnS—SiO$_2$ film to a thickness of 30 nm, for example, as the second dielectric layer 4 on the oxide/nitride dielectric layer 3.

Subsequently, a reactive sputtering operation is conducted, using a Ge target in a mixed gas atmosphere of Ar gas and N$_2$ gas typically under pressure of 0.9 Pa with a power density of 0.8 W/cm$^2$, for example, to form a GeN film to a thickness of 5 nm, for example, as the first interface layer 5 on the second dielectric layer 4.

Then, a sputtering operation is conducted, using a Ge$_2$Sb$_2$Te$_5$ target in an Ar gas atmosphere typically under pressure of 1.0 Pa with a power density of 0.27 W/cm$^2$, for example, to form a $Ge_2Sb_2Te_5$ film to a thickness of 13 nm, for example, as the recording layer 6 on the first interface layer 5.

Thereafter, a reactive sputtering operation is conducted, using a Ge target in a mixed gas atmosphere of Ar gas and $N_2$ gas typically under pressure of 0.9 Pa with a power density of 0.8 $W/cm^2$, for example, to form a GeN film to a thickness of 5 nm, for example, as the second interface layer 7 on the recording layer 6.

Subsequently, a sputtering operation is conducted, using a ZnS—$SiO_2$ target in an Ar gas atmosphere typically under pressure of 0.1 Pa with a power density of 2.2 $W/cm^2$, for example, to form a ZnS—$SiO_2$ film to a thickness of 25 nm, for example, as the third dielectric layer 8 on the second interface layer 7.

Then, a sputtering operation is conducted, using a target of an AlTi alloy containing Ti by 2 mass % in an Ar gas atmosphere typically under pressure of 0.08 Pa with a power density of 1.6 $W/cm^2$, for example, to form an AlTi alloy layer to a thickness of 100 nm, for example, as the reflection layer 9 on the third dielectric layer 8.

Then, a transparent substrate (not shown) typically to a thickness of 0.6 mm is bonded onto the reflection layer 9 to produce the phase change type optical disk of the first embodiment.

Now, the reason why the hexagon defined by (90, 9, 1) volume %, (80, 12, 8) volume %, (70, 12, 8) volume %, (70, 2, 28) volume %, (80, 3, 17) volume % and (90, 7, 3) volume % in terms of (Ar, $O_2$, $N_2$) volume % and the internal region of the hexagon is selected for the suitable range of the mixed gas composition when forming the film of the oxide/nitride dielectric layer 3 will be described below.

In an experiment, specimens were prepared for the oxide/nitride dielectric layer 3 (silicon-nickel oxide/nitride film), changing the composition of the mixed gas in the reactive sputtering operation. More specifically, the content ratios of Ar gas, $O_2$ gas and $N_2$ gas were changed respectively between 60 and 95 volume %, between 0 and 12 volume % and 1 and 40 volume % in accordance with the method of the fourth embodiment. As pointed out above, an $Si_{99}Ni_1$ target (at. %) was used as target and the gas pressure was held to 0.2 Pa during the film forming process.

Figure 2:
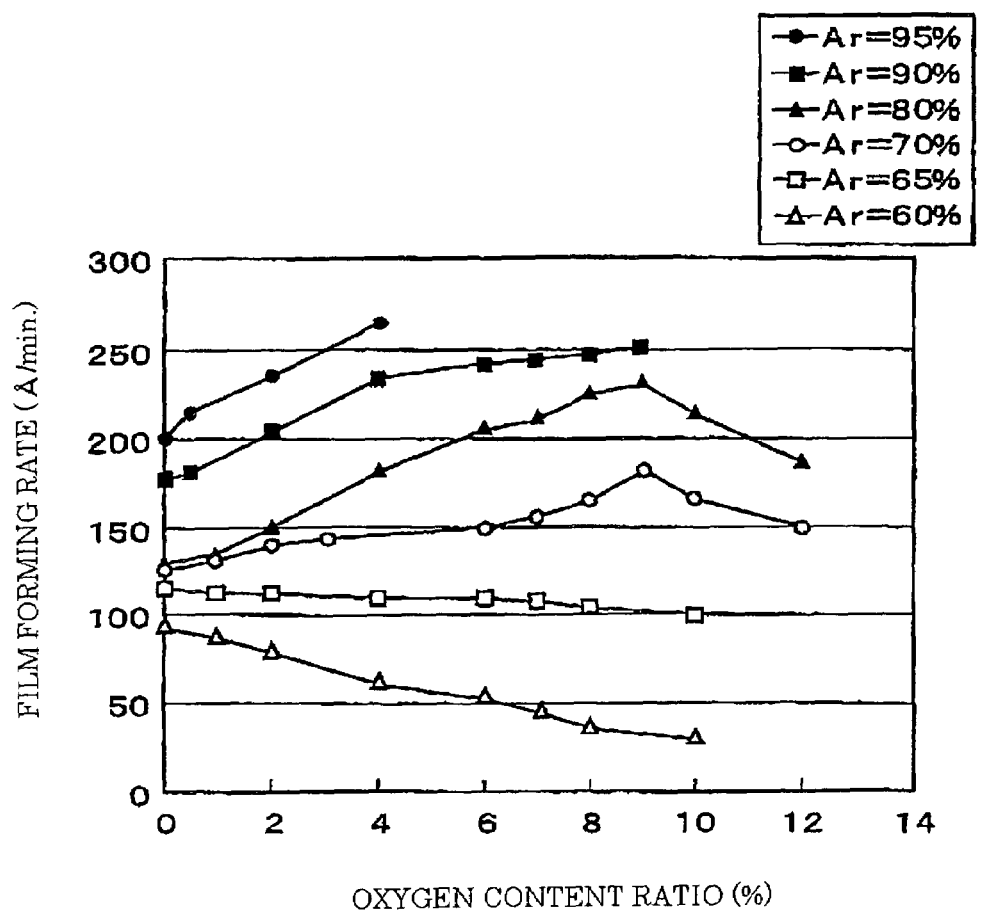
FIG. 2 is a graph illustrating the influence of the content ratio of $O_2$ gas in mixed gas on the film forming rate.
Figure 3:
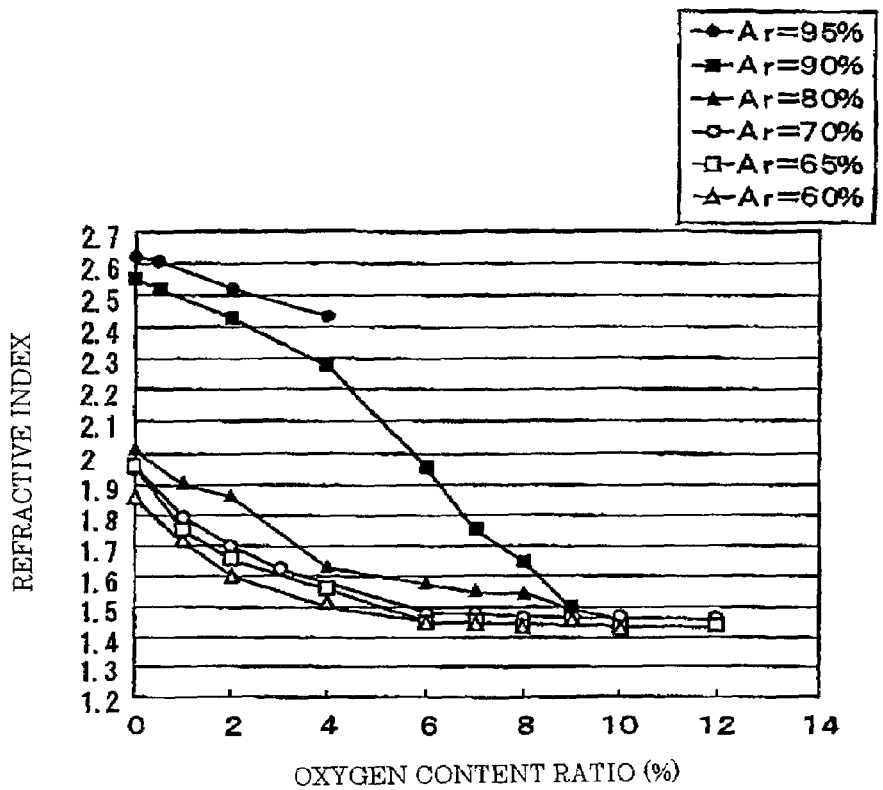
FIG. 3 is a graph illustrating the influence of the content ratio of $O_2$ gas in mixed gas on the refractive index of silicon-nickel oxide/nitride film.
Figure 6:
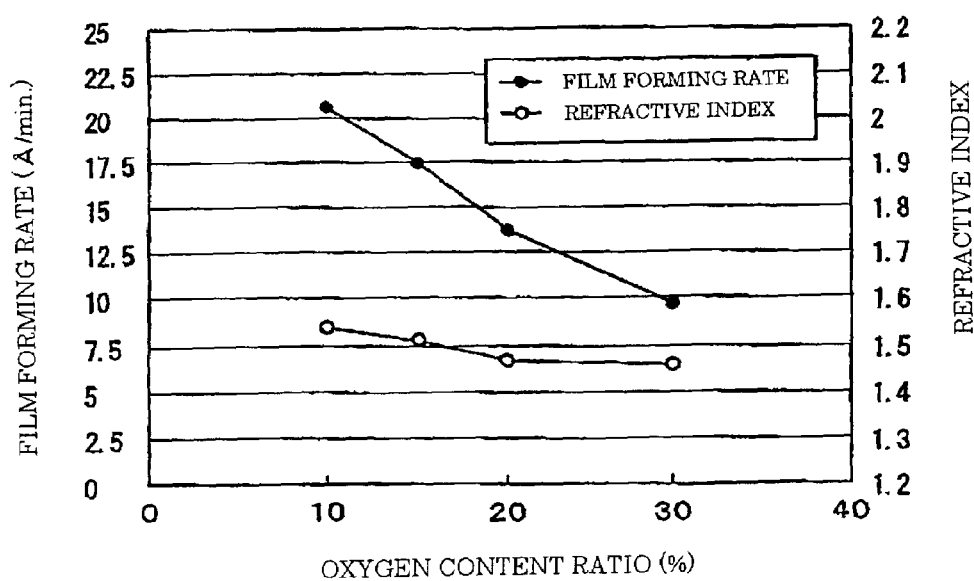
FIG. 6 is a graph illustrating the influence of the content ratio of $O_2$ gas in mixed gas on the film forming rate and the refractive index.

FIG. 2 is a graph illustrating the influence of the content ratio of $O_2$ gas in mixed gas on the film forming rate, the horizontal axis and the vertical axis of the graph representing respectively the content ratio of $O_2$ gas in mixed gas and the film forming rate of silicon-nickel oxide/nitride film. FIG. 3 is a graph illustrating the influence of the content ratio of $O_2$ gas in mixed gas on the refractive index of silicon-nickel oxide/nitride film, the horizontal axis and the vertical axis of the graph representing respectively the content ratio of $O_2$ gas in mixed gas and the refractive index of silicon-nickel oxide/nitride film. FIG. 6 is a graph illustrating the influence of the content ratio of $O_2$ gas in mixed gas on the film forming rate and the refractive index when mixed gas does not contain any $N_2$ gas, the horizontal axis and the vertical axis of the graph representing respectively the content ratio of $O_2$ gas in mixed gas and the film forming rate and the refractive index of silicon-nickel oxide/nitride film. While only the content ratio of Ar gas and that of $O_2$ gas are shown in FIGS. 2 and 3, it will be appreciated that the content ratio of $N_2$ gas can be obtained by subtracting the content ratio of Ar gas and that of $O_2$ gas from the total content ratio (100 volume %).

As seen from FIG. 2, the film forming rate rises as the content ratio of $O_2$ gas is increased when the content ratio of Ar gas is not lower than 70 volume %. The film forming rate rises as the content ratio of Ar gas is increased when the content ratio of $O_2$ gas is fixed. On the other hand, the film forming rate gradually falls as the content ratio of $O_2$ gas is increased when the content ratio of Ar gas is not higher than 65 volume %.

As seen from FIG. 3, while the refractive index of silicon-nickel oxide/nitride film gradually falls as the content ratio of $O_2$ gas is increased, the refractive index tends to show a small value when the content ratio of Ar gas is low.

Meanwhile, as pointed out above, the requirement to be met for the refractive index of the oxide/nitride dielectric layer 3 is that the refractive index of the ZnS—$SiO_2$ film of the first dielectric layer 2 and that of the ZnS—$SiO_2$ film of the second dielectric layer 4 are lower than 2.35 and the refractive index of the oxide/nitride dielectric layer 3 largely differs from both the refractive index of the first dielectric layer 2 and that of the second dielectric layer 4 for the reason as described below. If the refractive index of the oxide/nitride dielectric layer 3 is between 1.43 and 1.8, the thickness of the third dielectric layer 8 (ZnS—$SiO_2$ film) can be made relatively small within a relatively wide range (approximately between 15 nm and 40 nm) to meet the requirement of Aa<Ac for the recording layer 6. If, on the other hand, the refractive index of the oxide/nitride dielectric layer 3 is between 1.9 and 2.0, the thickness of the third dielectric layer 8 (ZnS—$SiO_2$ film) has inevitably to be made relatively large within a relatively narrow range (between 40 nm and 50 nm) to meet the requirement of Aa<Ac. Furthermore, if the refractive index of the oxide/nitride dielectric layer 3 is between 2.0 and 2.2, there is no solution for the thickness of the third dielectric layer (ZnS—$SiO_2$ film) to satisfy the requirement of Aa<Ac for the recording layer 6 because the refractive index of the oxide/nitride dielectric layer 3 differs only little from the refractive index of the first dielectric layer 2 and that of the second dielectric layer 4 so that it is impossible to design the information recording medium by using such values.

From above, the refractive index of the oxide/nitride dielectric layer 3 is preferably less than 1.9. Additionally, from the viewpoint of mass production, the film forming rate needs to be as high as possible.

The content ratio of the mixed gas that satisfies the above requirements corresponds to a composition selected from a hexagon defined by (90, 9, 1) volume %, (80, 12, 8) volume %, (70, 12, 8) volume %, (70, 2, 28) volume %, (80, 3, 17) volume % and (90, 7, 3) volume % in terms of (Ar, $O_2$, $N_2$) volume % and the internal region of the hexagon. More preferably, the content ratio of $O_2$ gas is 9 volume % provided that the content ratio of Ar gas is between 70 volume % and 90 volume % to achieve the highest film forming rate and a low refractive index.

The refractive index (n2) of the silicon-nickel oxide/nitride film formed by means of reactive sputtering in a mixed gas atmosphere showing such a composition is found within a range between 1.43 and 1.8. The light absorption coefficient of the recording layer 6 of a phase change type optical disk, of which the oxide/nitride dielectric layer 3 was formed by the above described process, was observed in a crystalline state and in an amorphous state. It was found that Aa=62.2% and Ac=82.4% when n2=1.43 and Aa=60.2% and Ac=81.5% when n2=1.8. The requirement of Aa<Ac was met in both cases.

Figure 4:
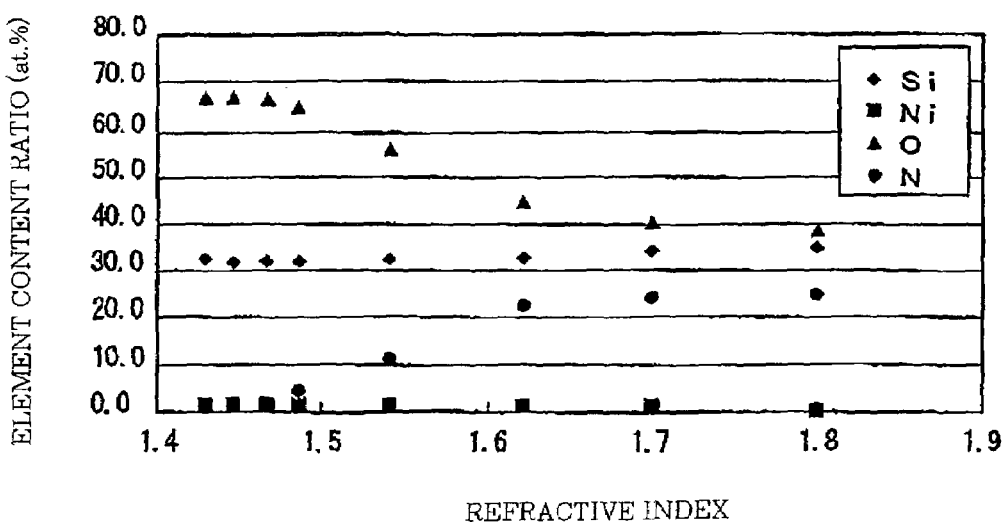
FIG. 4 is a graph illustrating the content ratios of the elements of silicon-nickel oxide/nitride films having different respective refractive indexes.

FIG. 4 illustrates the results obtained by analytically determining the content ratios of Si, Ni, O and N contained in SiNiON films showing different refractive indexes. FIG. 4 shows a tendency that the oxygen concentration decreases and the nitrogen concentration increases as the refractive index is raised in the case of SiNiON films whose refractive indexes are found within a range between 1.43 and 1.8. On the other hand, the silicon concentration shows a slightly increasing tendency as the refractive index is raised. Finally, the content ratio of Ni remains substantially at a same level regardless of the change in the value of the refractive index.

Figure 5:
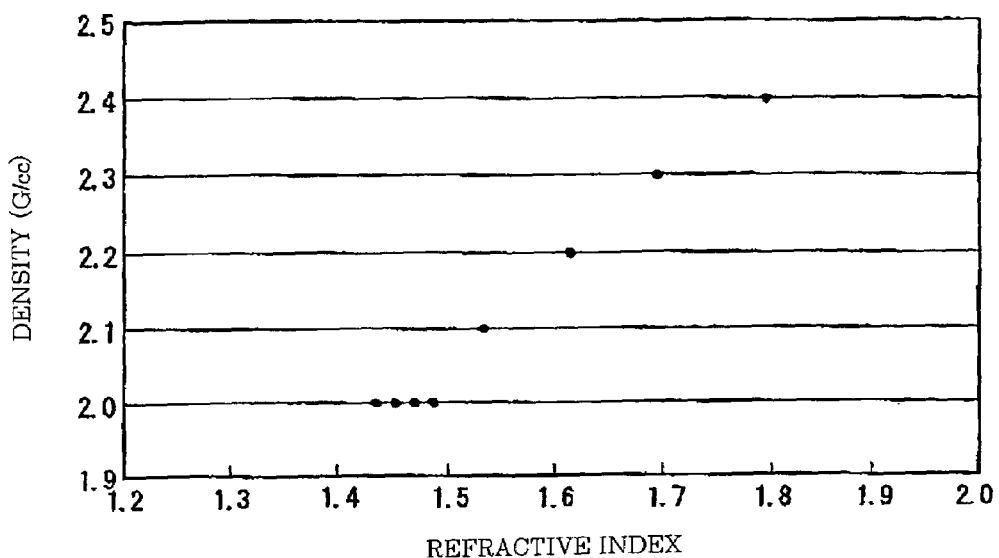
FIG. 5 is a graph illustrating the densities of different silicon-nickel oxide/nitride films.

FIG. 5 is a graph illustrating the relationship between the refractive index and the density of the same SiNiON films. The density of SiNiON film increases as the refractive index of the film rises. From FIGS. 4 and 5, it will be seen that the oxygen concentration and the film density of the silicon-nickel oxide/nitride films prepared with the above described composition of mixed gas are such that the oxygen concentration and the film density of a film showing a refractive index (n2) of 1.43 are 67.5 at. % and 2 g/cc respectively and those of a film showing a refractive index (n2) of 1.8 are 39 at. % and 2.4 g/cc respectively. When an oxide/nitride dielectric layer 3 whose refractive index is found within the above described range is used, the film thickness of the third dielectric layer 3 that satisfies the requirement of Aa<Ac is between 15 and 40 nm to prove that it is possible to design an information recording medium with a relatively wide margin for the film thickness. Thus, it is possible to manufacture optical disks that satisfy the requirement of Aa<Ac and show excellent repetitive recording/reproduction characteristics like the above-described embodiment with a high degree of productivity. The content ratios of the elements contained in the above described films and the film densities of the films were analyzed by means of RBS (Rutherford backscattering spectrometry) and NRA (nuclear reaction analysis).

Now, the reliability of a phase change type optical disk prepared under the above-described conditions will be discussed below. In an experiment, an optical disk of this embodiment was driven to rotate at a linear velocity of 5.9 m/sec and information was recorded on it by irradiating a blue laser beam showing a wavelength of 405 nm by means of an optical head having an objective lens with a numerical aperture of 0.65. More specifically, a signal with a frequency of 4 MHz and a duty ratio of 50% was recorded on a land section and subsequently a signal with a frequency of 8 MHz and a duty ratio of 50% was recorded on the adjacent groove sections located at the opposite lateral sides of the land section. Then, the above recording cycle was repeated and the change in the carrier of the signals with a frequency of 4 MHz recorded on the land sections was observed. As a result, it was found that the signals recorded on the land sections are not affected if the information recorded on the adjacent groove sections is rewritten repeatedly. Additionally, no change was observed in the carrier and the noise after repeating the operation of recording a signal with a frequency of 4 MHz and a duty ratio of 50% for 500,000 times.

Now, an experiment of using mixed gas containing no $N_2$ gas will be discussed below by referring to FIG. 6. In this experiment, an SiNiO film was prepared by reactive sputtering in place of the oxide/nitride dielectric layer 3 (see FIG. 1) of the embodiment. In other words, an $Si_{99}Ni_1$ target (at. %) was used in a mixed gas atmosphere containing only Ar gas and $O_2$ gas but not $N_2$ gas under pressure of 0.2 Pa and the target and the substrate were separated from each other by a distance of 15 cm for reactive sputtering with a power density of 2.2 W/cm$^2$ to form an SiNiO film. The content ratio of $O_2$ gas in the mixed gas was made to vary in the experiment.

As shown in FIG. 6, an SiNiO film showing a refractive index approximately between 1.45 and 1.54 is obtained when the content ratio of $O_2$ gas is found within a range between 10 and 30 volume %. However, the film forming rate is not higher than 21 Å/min, which is extremely low if compared with the film forming rate (approximately between 140 and 250 Å/min) that can be achieved in a mixed gas atmosphere containing Ar gas, $O_2$ gas and $N_2$ gas as described above. While the refractive index can satisfy the requirement of Aa<Ac, the process of this experiment is not recommendable for mass production because the film forming rate is extremely low.

Thus, the film forming rate is extremely low to remarkably reduce the productivity when an $Si_{99}Ni_1$ target (at. %) is used in a mixed gas atmosphere containing only rare gas such as Ar gas and oxygen gas to produce a film for an oxide dielectric layer.

Now, an experiment of using mixed gas containing no $O_2$ gas will be discussed below. In this experiment, an SiNiN film was prepared by reactive sputtering in place of the oxide/nitride dielectric layer 3 (see FIG. 1) of the embodiment. In other words, an $Si_{99}Ni_1$ target (at. %) was used in a mixed gas atmosphere containing only Ar gas and $N_2$ gas but not $O_2$ gas under pressure of 0.2 Pa and the target and the substrate were separated from each other by a distance of 15 cm for reactive sputtering with a power density of 2.5 W/cm$^2$ to form an SiNiN film. It will be appreciated that this corresponds to a case where the content ratio of $O_2$ gas is equal to 0% in FIGS. 2 and 3. From FIGS. 2 and 3, it will be seen that an SiNiN film is obtained with a refractive index of 1.95 when the content ratio of $O_2$ gas is equal to 0 volume % and the content ratio of Ar gas is 70 volume %. However, the film forming rate for the SiNiN film is low if compared with a case where the content ratio of $O_2$ gas is not lower than 2 volume %. In short, a silicon-nickel oxide/nitride film is much better than a silicon-nickel nitride film in terms of mass production.

Now, the repetitive recording/reproduction characteristics of a medium (optical disk) realized by using the SiNiN film with the refractive index of 1.95 for the oxide/nitride dielectric layer 3 and those of a medium (optical disk) realized by using a silicon-nickel oxide/nitride film with a refractive index of 1.43 for the oxide/nitride dielectric layer 3 will be discussed below. The arrangements of the two mediums will be described in detail below. Note that an arrangement where a film of material A is formed on a substrate to a thickness of "a" and another film of material B is formed on the film to a thickness of "b" is expressed by (substrate/A (a)/B (b)) hereinafter.

The arrangement of the optical disk realized by using an SiNiN film with a refractive index of 1.95 in place of the oxide/nitride dielectric layer 3 is expressed by (substrate/ZnS—SiO$_2$ (5 nm)/SiNiN (46 nm)/ZnS—SiO$_2$ (50 nm)/GeN (5 nm)/GeSbTe (11 nm)/GeN (5 nm)/ZnS—SiO$_2$ (46 nm)/AlTi (100 nm)). On the other hand, the arrangement of the optical disk realized by using a silicon-nickel oxide/nitride film with a refractive index of 1.43 for the oxide/nitride dielectric layer 3 is expressed by (substrate/ZnS—SiO$_2$ (35 nm)/silicon-nickel oxide/nitride (40 nm)/ZnS—SiO$_2$ (30 nm)/GeN (5 nm)/GeSbTe (11 nm)/GeN (5 nm)/ZnS—SiO$_2$ (25 nm)/AlTi (100 nm)).

In an experiment, each of the above-described optical disks of two different types was driven to rotate at a linear velocity of 5.9 m/sec and a signal with a frequency of 4 MHz and a duty ratio of 50% was repeatedly recorded on and reproduced from it by irradiating a laser beam showing a wavelength of 400 nm by means of an optical head having an objective lens with a numerical aperture of 0.65. The recording/reproduction cycle was repeated until the reproduced signal showed a degradation of 1 dB from the initial value. As a result, it was found that the optical disk realized by using the silicon-nickel oxide/nitride film with the refractive index of 1.43 did not show any degradation of the signal after 500,000 cycles. On the other hand, a degradation of the signal was observed on the optical disk realized by using the SiNiN film with the refractive index of 1.95 after about 30,000 cycles.

It may be presumed that the difference was generated by the following reasons. Since the refractive index (1.95) of the SiNiN film is higher than the refractive index (1.43) of the silicon-nickel oxide/nitride film, the film thickness (46 nm) of the third dielectric layer 8 (ZnS—SiO$_2$ film) of the optical disk realized by using the SiNiN film as the nitride dielectric layer has to be inevitably greater than the film thickness (25 nm) of the third dielectric layer 8 of the optical disk realized by using the silicon-nickel oxide/nitride film as oxide/nitride dielectric layer. Then, it is difficult for the heat supplied by the laser beam to escape to the side of the reflection layer 9 and hence the recording layer 6 can be degraded quickly by heat. Additionally, the SiNiN film shows a relatively high rigidity and hence is less flexible so that it can hardly withstand the repetitive thermal stress that is generated after a number of recording/reproduction cycles and becomes liable to give rise to signal degradation.

Thus, the use of the SiNiN film showing the refractive index of about 1.95 as replacement for the oxide/nitride dielectric layer 3 does not arise a problem of boosted noises unlike the use of an SiO$_2$ film or an Al$_2$O$_3$ film that entails such a problem due to a reduced film density. However, when the SiNiN film is used to replace the oxide/nitride dielectric layer 3, the difference of refractive index between the SiNiN film and the first dielectric layer is reduced significantly when compared with an instance where an SiO$_2$ film or an Al$_2$O$_3$ film is used. Therefore, if the light absorption coefficient Aa of the recording layer in the amorphous state is made lower than the light absorption coefficient Ac of the layer in the crystalline state, the film thickness of the third dielectric layer 8 will be significantly limited. In other words, the use of the SiNiN film reduces the degree of freedom for designing the entire optical information recording medium and makes the film thickness of the third dielectric layer 8 relatively large so that it will be difficult to secure satisfactory repetitive recording/reproduction characteristics of the medium.

As pointed out above, the productivity and the reliability of optical disks will be reduced when a silicon-nickel nitride film (SiNiN film) is used in place of the oxide/nitride dielectric layer 3 of the optical disk. To the contrary, the use of a silicon-nickel oxide/nitride film (SiNiON film) for the oxide/nitride dielectric layer 3 provides the phase change type optical disk medium having the advantages of a high degree of design freedom and mass production. From FIG. 3, it will be seen that the refractive index (n2) of the oxide/nitride dielectric layer 3 is about 1.95 when an SiNiON film is formed by using mixed gas containing argon gas by 90 volume % and oxygen gas by 6 volume %, the balance being nitrogen gas, and used for the layer 3. However, when an SiNiON film showing such a refractive index is used for the oxide/nitride dielectric layer 3, the third dielectric layer 8 (ZnS—SiO$_2$ film) has to be made relatively thick in order to meet the requirement of Aa<Ac as in the case of the above described SiNiN film with a refractive index of 1.95. Then, it is difficult for the heat supplied by the laser beam to escape to the side of the reflection layer 9 and hence the recording layer 6 can be degraded quickly by heat. Therefore, it is essential that the upper limit of refractive index is 1.9 even when an SiNiON film is used for the oxide/nitride dielectric layer 3.

Now, a fifth embodiment of the present invention will be described below. This is an embodiment of method of manufacturing an optical information recording medium (optical disk) as described above for the above described second embodiment. This embodiment differs from the above-described fourth embodiment in that an aluminum-nickel oxide/nitride film is formed for the oxide/nitride dielectric layer 3 in place of the silicon-nickel oxide/nitride film of the fourth embodiment. Other than this, the arrangement and the advantages of this embodiment are identical with those of the fourth embodiment.

More specifically, a first dielectric layer 2 is formed on a transparent substrate 1 as shown in FIG. 1 by following a process similar to the one described above for the fourth embodiment. Then, a reactive sputtering operation is conducted, using an Al$_{99}$Ni$_1$ target (at. %) in a mixed gas atmosphere of Ar gas, N$_2$ gas and O$_2$ gas typically under pressure of 0.2 Pa with a power density of 2.5 W/cm$^2$, for example, to form an aluminum-nickel oxide/nitride film to a thickness of 40 nm, for example, as the oxide/nitride dielectric layer 3 on the first dielectric layer 2.

The mixed gas that is used for the reactive sputtering operation has a composition within a hexagon defined by (90, 9, 1) volume %, (80, 12, 8) volume %, (70, 12, 8) volume %, (70, 2, 28) volume %, (80, 3, 17) volume % and (90, 7, 3) volume % in terms of (Ar, O$_2$, N$_2$) volume %.

Then, a second dielectric layer 4, a first interface layer 5, a recording layer 6, a second interface layer 7, a third dielectric layer 8 and a reflection layer 9 are formed sequentially on the oxide/nitride dielectric layer 3 in the above described order by following the process described above for the fourth embodiment. Then, a transparent substrate is bonded on top to produce the optical disk of the second embodiment.

Now, the reason why the above defined hexagon and the internal region thereof are selected for the suitable range of the mixed gas composition when forming the film of the oxide/nitride dielectric layer 3 will be described below.

In an experiment, specimens of aluminum-nickel oxide/nitride film were prepared for the oxide/nitride dielectric layer by changing the composition of the mixed gas in the reactive sputtering operation. More specifically, the content ratios of Ar gas, O$_2$ gas and N$_2$ gas were changed respectively between 60 and 95 volume %, between 0 and 12 volume % and 1 and 40 volume %. As pointed out above, an Al$_{99}$Ni$_1$ target (at. %) was used as target and the gas pressure was held to 0.2 Pa during the film forming process.

Figure 7:
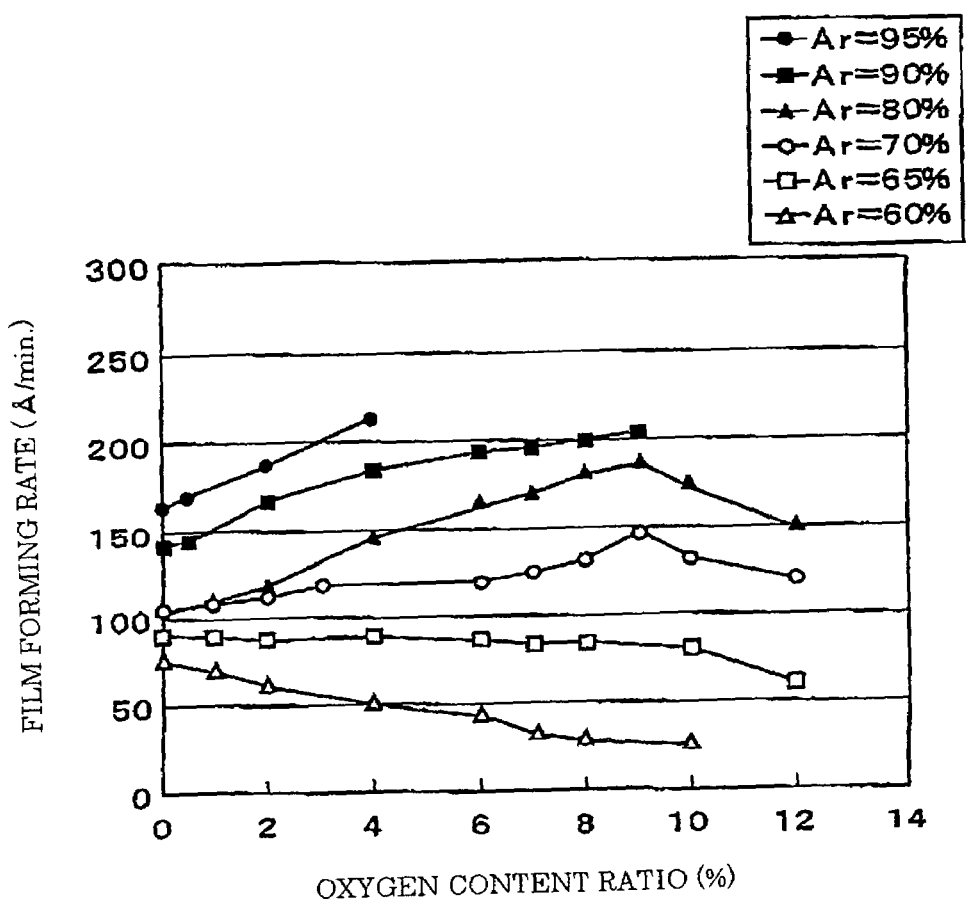
FIG. 7 is a graph illustrating the influence of the content ratio of $O_2$ gas in mixed gas on the film forming rate.
Figure 8:
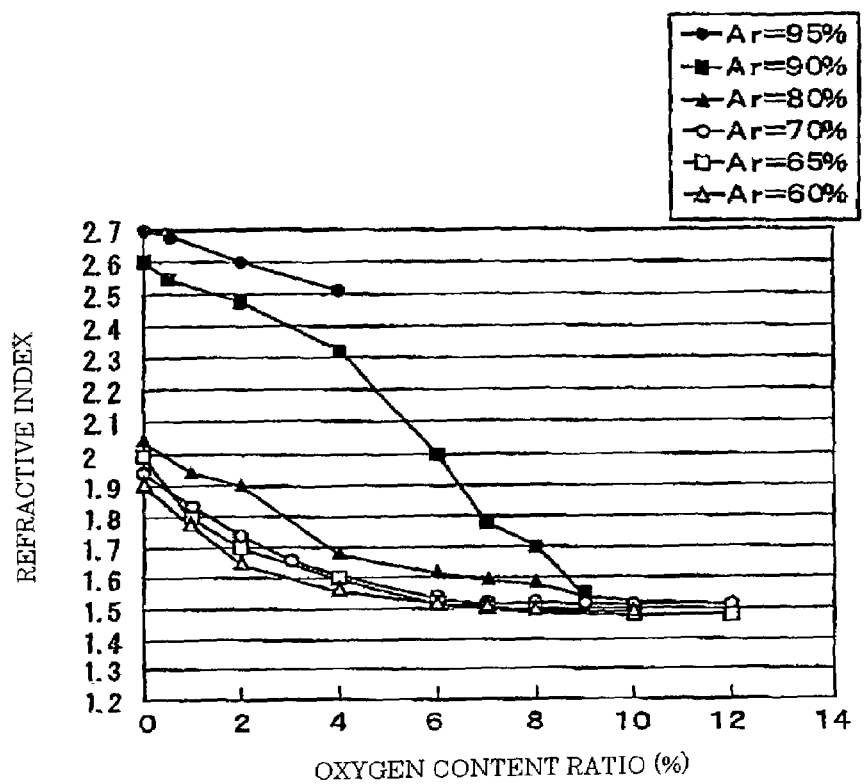
FIG. 8 is a graph illustrating the influence of the content ratio of $O_2$ gas in mixed gas on the refractive index.
Figure 9:
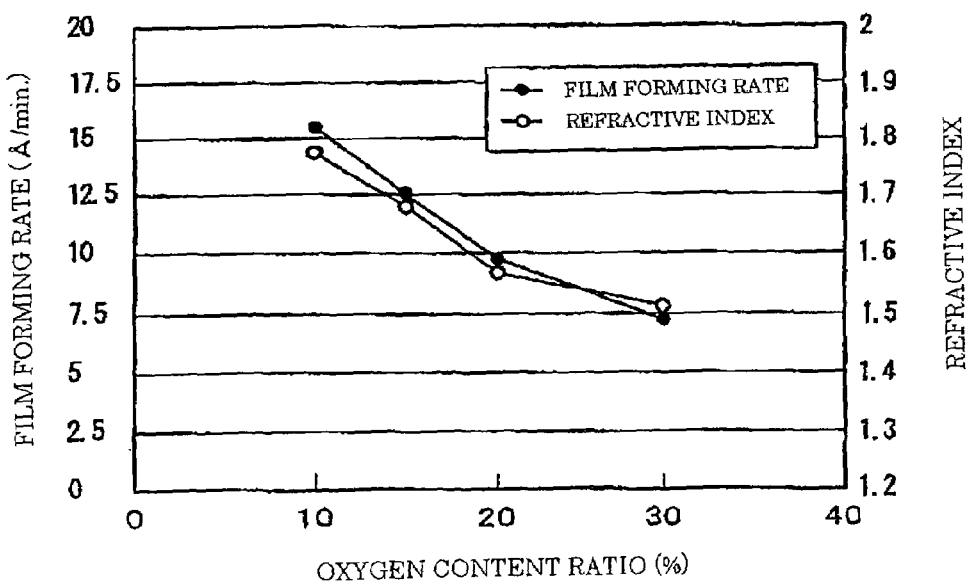
FIG. 9 is a graph illustrating the influence of the content ratio $O_2$ gas in mixed gas on the film forming rate and the refractive index.

FIG. 7 is a graph illustrating the influence of the content ratio of O$_2$ gas in mixed gas on the film forming rate, the horizontal axis and the vertical axis of the graph representing respectively the content ratio of O$_2$ gas in mixed gas and the film forming rate of aluminum-nickel oxide/nitride film. FIG. 8 is a graph illustrating the influence of the content ratio of O$_2$ gas in mixed gas on the refractive index, the horizontal axis and the vertical axis of the graph representing respectively the content ratio of O$_2$ gas in mixed gas and the refractive index of aluminum-nickel oxide/nitride film. FIG. 9 is a graph illustrating the influence of the content ratio of O$_2$ gas in mixed gas on the film forming rate and the refractive index when mixed gas does not contain any N$_2$ gas, the horizontal axis and the vertical axis of the graph representing respectively the content ratio of O$_2$ gas in mixed gas and the film forming rate and the refractive index of aluminum-nickel oxide film (AlNiO film).

As seen from FIG. 7, the film forming rate rises as the content ratio of O$_2$ gas is increased when the content ratio of Ar gas is not lower than 70 volume %. The film forming rate rises as the content ratio of Ar gas is increased when the content ratio of O$_2$ gas is fixed. On the other hand, the film forming rate gradually falls as the content ratio of O$_2$ gas is increased when the content ratio of Ar gas is not higher than 65 volume %. This tendency is also observed when a silicon-nickel oxide/nitride film is formed by reactive sputtering.

As seen from FIG. 8, while the refractive index of aluminum-nickel oxide/nitride film gradually falls as the content ratio of $O_2$ gas is increased, the refractive index tends to show a small value when the content ratio of Ar gas is low.

Meanwhile, as pointed out above, the requirement to be met for the refractive index of the oxide/nitride dielectric layer 3 is that the refractive index thereof is lower than 2.35 which are those of the ZnS—$SiO_2$ film of the first dielectric layer 2 and the ZnS—$SiO_2$ film of the second dielectric layer 4, and the refractive index of the oxide/nitride dielectric layer 3 largely differs from both the refractive index of the first dielectric layer 2 and that of the second dielectric layer 4 for the reason as described above for the oxide/nitride dielectric layer 3 that is made of an SiNiON film. Additionally from the viewpoint of mass production, the film forming rate needs to be as high as possible. The content ratio of the mixed gas that satisfies the above requirements corresponds to a composition selected from a hexagon defined by (90, 9, 1) volume %, (80, 12, 8) volume %, (70, 12, 8) volume %, (70, 2, 28) volume %, (80, 3, 17) volume % and (90, 7, 3) volume % in terms of (Ar, O, N) volume % and the internal region of the hexagon. More preferably, the content ratio of $O_2$ gas is 9 volume % provided that the content ratio of Ar gas is between 70 volume % and 90 volume % to achieve the highest film forming rate and a low refractive index.

The refractive index (n2) of the aluminum-nickel oxide/nitride film formed under the above-described conditions is found within a range between 1.5 and 1.8. The light absorption coefficient of the recording layer 6 of a phase change type optical disk, of which the oxide/nitride dielectric layer 3 was formed by the above-described process, was observed in a crystalline state and in an amorphous state. It was found that Aa=60.2% and Ac=81.8% when n2=1.5 and Aa=60.2% and Ac=81.5% when n2=1.8. The requirement of Aa<Ac was met in both cases. The prepared specimens of aluminum-nicked oxide/nitride film were analyzed for the oxygen concentration and the film density as in the case of SiNiON film. The oxygen concentration and the film density of a film showing a refractive index (n2) of 1.5 are 67.5 at. % and 2 (g/cc) respectively and those of a film showing a refractive index (n2) of 1.6 are 50 at. % and 2.2 (g/cc) respectively, whereas those of a film showing a refractive index (n2) of 1.8 are 35 at. % and 2.4 (g/cc). As in the case where a silicon-nickel oxide/nitride film is used for the oxide/nitride dielectric layer 3, the film thickness of the third dielectric layer 8 that satisfies the requirement of Aa<Ac is between 15 and 40 nm to prove that it is possible to design an information recording medium with a relatively wide margin for the film thickness.

Now, the reliability of the phase change type optical disk of information recording medium prepared under the above-described conditions will be discussed below. In an experiment, an optical disk of this embodiment was driven to rotate at a linear velocity of 5.9 m/sec and information was recorded on it by irradiating a blue laser beam showing a wavelength of 405 nm by means of an optical head having an objective lens with a numerical aperture of 0.65. More specifically, a signal with a frequency of 4 MHz and a duty ratio of 50% was recorded on a land section and subsequently a signal with a frequency of 8 MHz and a duty ratio of 50% was recorded on the adjacent groove sections located at the opposite lateral sides of the land section. Then, the above recording cycle was repeated and the change in the carrier of the signals recorded on the land sections was observed. As a result, it was found that the signals recorded on the land sections are not affected when the information recorded on the adjacent groove sections is rewritten repeatedly. Additionally, no change was observed in the carrier and the noise after repeating the operation of recording a signal with a frequency of 4 MHz and a duty ratio of 50% for 500,000 times.

Now, an experiment using mixed gas containing no $N_2$ gas will be discussed below by referring to FIG. 9. In this experiment, an AlNiO film was prepared by reactive sputtering in place of the oxide/nitride dielectric layer 3 (see FIG. 1) of the embodiment. In other words, an $Al_{99}Ni_1$ target (at. %) was used in a mixed gas atmosphere containing only Ar gas and $O_2$ gas but not $N_2$ gas under pressure of 0.2 Pa and the target and the substrate were separated from each other by a distance of 15 cm for reactive sputtering with a power density of 2.5 W/cm² to form the AlNiO film. The content ratio of $O_2$ gas in the mixed gas was made to vary in the experiment.

As shown in FIG. 9, the AlNiO film showing a refractive index approximately between 1.50 and 1.77 is obtained when the content ratio of $O_2$ gas is found within a range between 10 and 30 volume %. However, the film forming rate is not higher than 16 Å/min, which is extremely low if compared with the film forming rate (approximately between 120 and 200 Å/min) that is achieved in the mixed gas atmosphere containing the Ar gas, the $O_2$ gas and the $N_2$ gas as described above. While the refractive index can satisfy the requirement of Aa<Ac, the process of this experiment is not recommendable for mass production because the film forming rate is extremely low. Thus, the film forming rate is extremely low to remarkably reduce the productivity when an $Al_{99}Ni_1$ target (at. %) is used in a mixed gas atmosphere containing only rare gas such as the Ar gas and the oxygen gas to produce the AlNiO film.

Now, an experiment using mixed gas containing no $O_2$ gas will be discussed below. In this experiment, an AlNiN film was prepared by reactive sputtering in place of the oxide/nitride dielectric layer 3 (see FIG. 1) of the embodiment. In other words, an $Al_{99}Ni_1$ target (at. %) was used in a mixed gas atmosphere containing only Ar gas and $N_2$ gas but not $O_2$ gas under pressure of 0.2 Pa and the target and the substrate were separated from each other by a distance of 15 cm for reactive sputtering with a power density of 2.5 W/cm² to form an AlNiN film. It will be appreciated that this corresponds to a case where the content ratio of $O_2$ gas is equal to 0% in FIGS. 7 and 8. From FIGS. 7 and 8, it will be seen that the AlNiN film is obtained with a refractive index of 1.95 when the content ratio of $O_2$ gas is equal to 0 volume % and the content ratio of Ar gas is 70 volume %. However, the film forming rate for the AlNiN film is low if compared with a case where the content ratio of $O_2$ gas is not lower than 2 volume %. In short, the aluminum-nickel oxide/nitride film of the fifth embodiment is better than the aluminum-nickel nitride film in terms of mass production.

Now, the repetitive recording/reproduction characteristics of the medium (optical disk) realized by using the AlNiN film with the refractive index of 1.95 for the oxide/nitride dielectric layer 3 and those of a medium (optical disk) realized by using an aluminum-nickel oxide/nitride film with a refractive index of 1.55 for the oxide/nitride dielectric layer 3 will be discussed below.

The arrangements of the two mediums will be described in detail below. The arrangement of the optical disk realized by using the AlNiN film with the refractive index of 1.95 in place of the oxide/nitride dielectric layer 3 is realized by ZnS—$SiO_2$ (5 nm)/AlNiN (41 nm)/ZnS—$SiO_2$ (50 nm)/GeN (5 nm)/GeSbTe (11 nm)/GeN (5 nm)/ZnS—$SiO_2$ (50 nm)/AlTi (100 nm). On the other hand, the arrangement of the optical disk realized by using the aluminum-nickel oxide/nitride film with the refractive index of 1.55 for the oxide/nitride dielectric layer 3 is realized by (substrate/ZnS—$SiO_2$ (35 nm)/ aluminum-nickel oxide/nitride (40 nm)/ZnS—SiO$_2$ (30 nm)/ GeN (5 nm)/GeSbTe (11 nm)/GeN (5 nm)/ZnS—SiO$_2$ (25 nm)/AlTi (100 nm)).

In an experiment, each of the above described optical disks of two different types was driven to rotate at a linear velocity of 5.9 m/sec and a signal with a frequency of 4 MHz and a duty ratio of 50% was repeatedly recorded on and reproduced from it by irradiating a laser beam showing a wavelength of 400 nm by means of an optical head having an objective lens with a numerical aperture of 0.65. The recording/reproduction cycle was repeated until the reproduced signal shows a degradation of 1 dB from the initial value. As a result, it was found that the optical disk realized by using the aluminum-nickel oxide/nitride film with the refractive index of 1.55 did not show any degradation of the signal after 500,000 cycles. On the other hand, a degradation of the signal was observed on the optical disk realized by using the AlNiN film with the refractive index of 1.95 after about 30,000 cycles.

It may be presumed that the difference was generated by the following reasons. Since the refractive index (1.95) of the AlNiN film is higher than the refractive index (1.55) of the aluminum-nickel oxide/nitride film, the film thickness (50 nm) of the third dielectric layer 8 (ZnS—SiO$_2$ film) of the optical disk realized by using the AlNiN film in place of the oxide/nitride dielectric layer 3 has to be inevitably greater than the film thickness (25 nm) of the third dielectric layer 8 of the optical disk realized by using the aluminum-nickel oxide/nitride film as the oxide/nitride dielectric layer 3. Then, it is difficult for the heat supplied by the laser beam to escape to the side of the reflection layer 9 and hence the recording layer 6 is degraded quickly by heat. Additionally, the AlNiN film shows a relatively high rigidity and hence is less flexible so that it can hardly withstand the repetitive thermal stress that is generated after a number of recording/reproduction cycles and becomes liable to give rise to signal degradation.

As pointed out above, the productivity and the reliability of optical disks will be reduced when the aluminum-nickel nitride film (AlNiN film) is used in place of the oxide/nitride dielectric layer 3 of the optical disk. To the contrary, the use of the aluminum-nickel oxide/nitride film (AlNiON film) for the oxide/nitride dielectric layer 3 provides the advantages of a high degree of design freedom and mass production.

Now, a sixth embodiment of the present invention will be described below. This is an embodiment of method of manufacturing the optical information recording medium (optical disk) as described above for the above described third embodiment. This embodiment differs from the above-described fourth embodiment in that an aluminum-silicon-nickel oxide/nitride film (AlSiNiON film) is formed for the oxide/nitride dielectric layer 3 in place of the silicon-nickel oxide/nitride film of the fourth embodiment. Other than this, the arrangement and the advantages of this embodiment are identical with those of the fourth embodiment.

More specifically, a first dielectric layer 2 is formed on a transparent substrate 1 as shown in FIG. 1 by following a process similar to the one described above for the fourth embodiment. Then, a reactive sputtering operation is conducted, using an (AlSi)$_{99}$Ni$_1$ target (at. %) in a mixed gas atmosphere of Ar gas, N$_2$ gas and O$_2$ gas typically under pressure of 0.2 Pa with a power density of 2.5 W/cm$^2$, for example, to form an aluminum-silicon-nickel oxide/nitride film to a thickness of 40 nm, for example, as the oxide/nitride dielectric layer 3 on the first dielectric layer 2. The mixed gas that is used for the reactive sputtering operation has a composition within a hexagon defined by (90, 9, 1) volume %, (80, 12, 8) volume %, (70, 12, 8) volume %, (70, 2, 28) volume %, (80, 3, 17) volume % and (90, 7, 3) volume % in terms of (Ar, O$_2$, N$_2$) volume %.

Then, a second dielectric layer 4, a first interface layer 5, a recording layer 6, a second interface layer 7, a third dielectric layer 8 and a reflection layer 9 are formed sequentially on the oxide/nitride dielectric layer 3 in the above described order by following the process described above for the fourth embodiment. Then, a transparent substrate is bonded on top to produce an optical disk of the third embodiment.

Now, the reason why the hexagon defined above and the internal region thereof is selected will be described below.

In an experiment, specimens of aluminum-silicon-nickel oxide/nitride film were prepared for the oxide/nitride dielectric layer, changing the composition of the mixed gas in the reactive sputtering operation. More specifically, the content ratios of Ar gas, O$_2$ gas and N$_2$ gas were changed respectively between 60 and 95 volume %, between 0 and 12 volume % and 1 and 40 volume %. As pointed out above, the (AlSi)$_{99}$Ni$_1$ target (at. %) was used as target and the gas pressure was held to 0.2 Pa during the film forming process.

As in the case of the above-described fourth embodiment, the film forming rate rises as the content ratio of O$_2$ gas is increased when the content ratio of Ar gas is not lower than 70 volume %. While the refractive index of the aluminum-silicon-nickel oxide/nitride film gradually falls as the content ratio of O$_2$ gas is increased, the refractive index tends to show a small value when the content ratio of Ar gas is low.

From the above-described results, it is preferable that the mixed gas that is used for the reactive sputtering operation has a composition within a hexagon defined by (90, 9, 1) volume %, (80, 12, 8) volume %, (70, 12, 8) volume %, (70, 2, 28) volume %, (80, 3, 17) volume % and (90, 7, 3) volume % in terms of (Ar, O$_2$, N$_2$) volume % in order to confine the refractive index of the oxide/nitride dielectric layer 3 to a range between 1.43 and 1.8 for raising the rate of forming the aluminum-silicon-nickel oxide/nitride film when such the film is used for the oxide/nitride dielectric layer 3.

The light absorption coefficient of the recording layer 6 of a phase change type optical disk, of which the oxide/nitride dielectric layer 3 was formed by the above described process, was observed in a crystalline state (Ac) and in an amorphous state (Aa). It was found that Aa=62.2% and Ac=82.4% when n2=1.43 and Aa=60.2% and Ac=81.5% when n2=1.8. The requirement of Aa<Ac was met in both cases. The prepared specimens of aluminum-silicon-nickel oxide/nitride film were analyzed for the oxygen concentration and the film density as in the case of SiNiON film. The oxygen concentration and the film density of the film showing the refractive index (n2) of 1.43 are 67.5 at. % and 2 g/cc respectively and those of the film showing the refractive index (n2) of 1.6 are 50 at. % and 2.2 g/cc respectively, whereas those of the film showing the refractive index (n2) of 1.8 are 39 at. % and 2.4 g/cc. As in the case where the silicon-nickel oxide/nitride film is used for the oxide/nitride dielectric layer 3, the film thickness of the third dielectric layer 3 that satisfies the requirement of Aa<Ac is between 15 and 40 nm to prove that it is possible to design an information recording medium with a relatively wide margin for the film thickness. Thus, optical disks satisfying the requirement of Aa<Ac and showing excellent repetitive recording/reproduction characteristics can be manufactured with a high productivity by means of the manufacturing method of this embodiment.

Now, the reliability of the phase change type optical disk of information recording medium prepared under the above-described conditions will be discussed below. In an experiment, the optical disk of this embodiment was driven to rotate at a linear velocity of 5.9 m/sec and information was recorded on it by irradiating a blue laser beam showing a wavelength of 405 nm by means of an optical head having an objective lens with a numerical aperture of 0.65. More specifically, a signal with a frequency of 4 MHz and a duty ratio of 50% was recorded on a land section and subsequently a signal with a frequency of 8 MHz and a duty ratio of 50% was recorded on the adjacent groove sections located at the opposite lateral sides of the land section. Then, the above recording cycle was repeated and the change in the carrier of the signals recorded on the land sections was observed. As a result, it was found that the signals recorded on the land sections are not affected if the information recorded on the adjacent groove sections is rewritten repeatedly. Additionally, no change was observed in the carrier and the noise after repeating the operation of recording the signal with the frequency of 4 MHz and the duty ratio of 50% for 500,000 times.

The film characteristics and the medium characteristics of the optical disk according to the invention are described above in terms of forming the oxide/nitride dielectric layer 3 of the optical disk by using the target containing Si, Al or AlSi as principal ingredient, to which Ni is added by 1 at. % for each of the above described embodiments.

Figure 10:
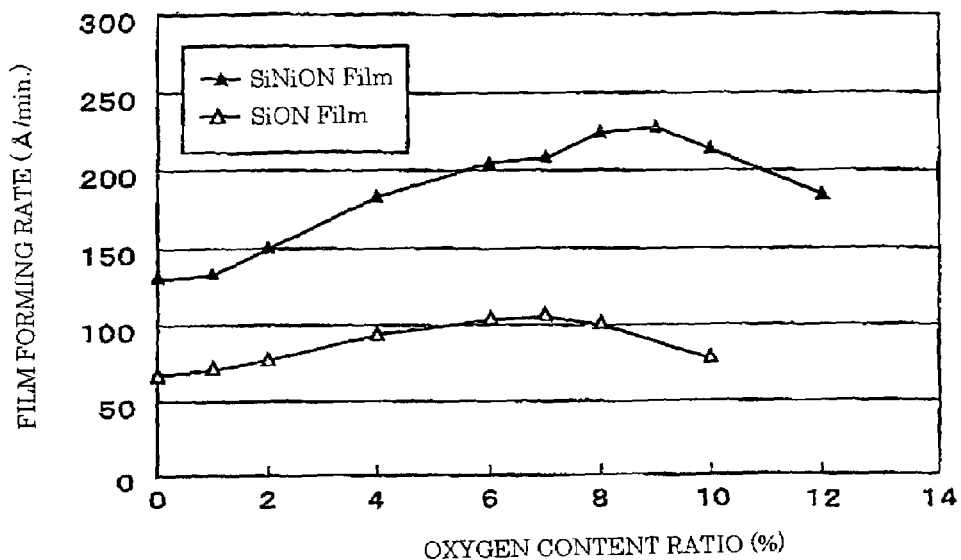
FIG. 10 is a graph comparing the film forming rate of a film containing Ni and that of a film not containing Ni.
Figure 11:
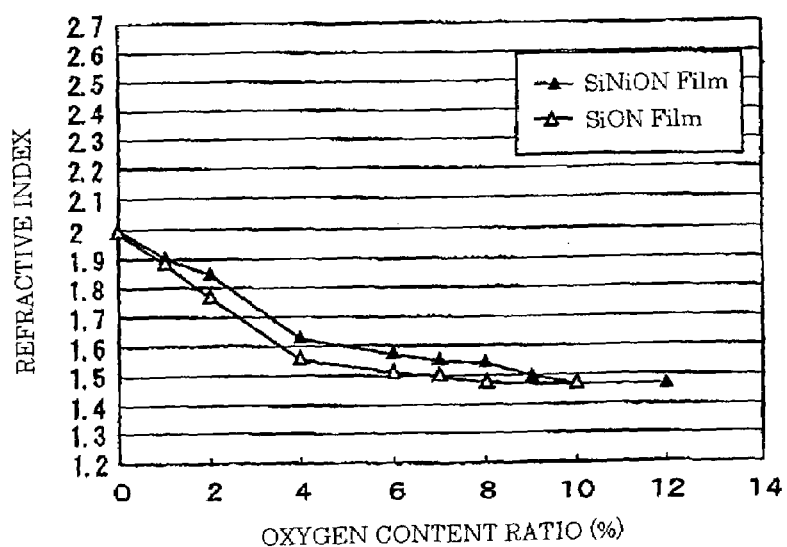
FIG. 11 is a graph comparing the refractive indexes of a film containing Ni and of a film not containing Ni.

FIG. 10 is a graph comparing the film forming rate of an SiNiON film, using a target containing Si as principal ingredient, to which Ni is added by 1 at. % and that of an SiON film, using a target containing Si as principal ingredient but not containing Ni. FIG. 11 is a graph comparing the refractive indexes of the two films. Mixed gas containing Ar gas by 80 volume % is used for both of the films as typical instance. From FIG. 10, it will be seen that the highest film forming rate of 230 Å/min is achieved for the SiNiON film when the content ratio of $O_2$ is equal to 9 volume %, whereas the highest film forming rate of 108 Å/min is achieved for the SiON film when the content ratio of $O_2$ is equal to 7 volume %. From the above comparison, it will be seen that the SiNiON film provides the film forming rate more than twice as high as the film forming rate of the conventional SiON film. As for refractive index, the both films show the same refractive index value of 1.5. The reason for the above difference is presumed that the Si oxidizing reaction is suppressed on the surface of the Si target to raise the sputtering rate when Ni is added to the Si target. This phenomenon is also observed when an AlNiON film and an AlSiNiON film are formed by adding Ni to the targets containing Al and AlSi as principal ingredients respectively. Thus, it is found that the oxide/nitride dielectric film is obtained at a high film forming rate to prove an excellent productivity when Ni is added to the target.

While Ni is added by 1 at. % to the targets containing Si, Al or AlSi as principal ingredient to form the oxide/nitride dielectric layers 3 of the above described embodiments, it has also been found that Ni may be replaced with Ti, Cr, Co, Ta, C or Cu to achieve a similar film forming rate, which is by far higher than the film forming rate of forming a conventional SiON film, although the refractive index remains substantially to the same level. Table 1 below shows the highest film forming rates and the refractive indexes of various samples containing different auxiliary ingredients relative to those of a conventional SiON film. The highest film forming rate of forming the conventional SiON film and the refractive index of the film are respectively 108 Å/min and 1.499 when the Ar content ratio of the mixed gas used for forming the film is 80 volume %.

TABLE 1

| principal ingredient | auxiliary ingredient (content ratio: 1 volume %)(upper row: film forming rate (Å/min) (lower row: refractive index) | | | | | | |
|---|---|---|---|---|---|---|---|
| | Ni | Ti | Cr | Co | Ta | C | Cu |
| Si | 230.0 | 228.5 | 225.8 | 228.7 | 229.6 | 220.6 | 224.9 |
| | 1.503 | 1.508 | 1.503 | 1.507 | 1.509 | 1.510 | 1.503 |
| Al | 180.6 | 182.6 | 175.3 | 192.4 | 194.2 | 168.4 | 189.8 |
| | 1.543 | 1.523 | 1.568 | 1.530 | 1.528 | 1.543 | 1.528 |
| AlSi | 210.5 | 211.3 | 202.6 | 207.8 | 210.3 | 200.6 | 205.6 |
| | 1.524 | 1.524 | 1.533 | 1.524 | 1.530 | 1.572 | 1.531 |

From Table 1, all the films containing the respective auxiliary ingredients provide a higher film forming rate and an excellent productivity than the conventional SiON film.

The film characteristics and the medium characteristics that are obtained when Ni is added to the target containing Si, Al and AlSi as respective principal ingredients by 1 at. % to form the oxide/nitride dielectric layers 3 of the fourth through sixth embodiments are described above. In the description of the following embodiments, the reason why the content ratio of Ni, Ti, Cr, Co, Ta, C or Cu is limited to a range between 0.2 at. % and 10 at. % will become clear.

Firstly, a seventh embodiment of the present invention will be described below. In an experiment using various samples of oxide/nitride dielectric layer 3 formed by using a target containing Si, Al or AlSi as principal ingredient, Ni, Ti, Cr, Co, Ta, C and Cu were added as auxiliary ingredient to the respective samples and the content ratio of the auxiliary ingredient was made to vary within a range between 0 at. % and 15 at. %. As a result, no significant differences were observed among the samples in terms of both film forming rate and refractive index if the content ratio of the auxiliary ingredient was made to vary in the range between 0 at. % and 15 at. %. However, it was found that there existed a range for the content ratio of the auxiliary ingredient that produced a slight change in the reflectivity as a result of a number of tests conducted for the recording sensitivity of the samples of optical disk medium and environment tests conducted on the samples, whose oxide/nitride dielectric layers 3 were formed by using the above auxiliary ingredients. Note that the sample mediums subjected to evaluation tests as described below are prepared by means of an arrangement same as those described above for the fourth through sixth embodiments except for the auxiliary ingredient and the composition of the oxide/nitride dielectric layer 3.

Ni is selected as an additive for an eighth embodiment of the invention. In an experiment, an environment test was conducted on samples of optical disk medium of this embodiment prepared with varying the Ni content ratio within a range between 0 at. % and 15 at. %. In the environment test, each sample was held in a thermo-hygro-regulator tank of 80° C. and 90% humidity ratio for 3,000 hours and subsequently, the sample was taken out and the change in the reflectivity before and after the environment test was observed (ΔR (%)=reflectivity before the test–reflectivity after the test). Table 2 below shows the relationship between the content ratio "x" (at. %) of the auxiliary ingredient and ΔR (%) when the auxiliary ingredient is Ni.

TABLE 2

| Ni content ratio: x | 0 | 0.3 | 0.4 | 0.5 | 1 | 5 | 10 | 11 | 12 | 15 |
|---|---|---|---|---|---|---|---|---|---|---|
| Si(100 − x) | 0.3 | 0.1 | 0 | 0 | 0 | 0 | 0 | 0 | 0 | 0 |
| Al(100 − x) | 0.4 | 0.4 | 0 | 0 | 0 | 0 | 0 | 0 | 0 | 0 |
| AlSi(100 − x) | 0.5 | 0.3 | 0 | 0 | 0 | 0 | 0 | 0 | 0 | 0 |

Table 3 below shows the relationship between the recording sensitivity (recording power (mW)) and the content ratio "x" (at. %) of the auxiliary ingredient of samples of optical disk medium of this embodiment prepared with varying the Ni content ratio within a range between 0 at. % and 15 at. %.

TABLE 3

| Ni content ratio: x | 0 | 0.3 | 0.4 | 0.5 | 1 | 5 | 10 | 11 | 12 | 15 |
|---|---|---|---|---|---|---|---|---|---|---|
| Si(100 − x) | 5.4 | 5.4 | 5.4 | 5.4 | 5.4 | 5.4 | 5.5 | 5.5 | 6.0 | 6.7 |
| Al(100 − x) | 5.5 | 5.5 | 5.5 | 5.5 | 5.6 | 5.6 | 5.7 | 5.7 | 6.1 | 6.8 |
| AlSi(100 − x) | 5.4 | 5.4 | 5.4 | 5.4 | 5.4 | 5.5 | 5.6 | 5.6 | 5.9 | 6.6 |

Generally, it is desirable for medium characteristics that the difference of the reflectivity before and after the environment test is infinitely close to nil and the recording sensitivity is as high as possible (to make the optimal recording power relatively small). Taking these into consideration, it will be seen from Tables 1 and 2 that the effect of adding Ni to the Si, Al or AlSi target is remarkable when the content ratio of Ni is found within a range between 0.15 at. % and 11 at. %. More particularly, when the content ratio of Ni is found within a range between 0.2 at. % and 10 at. % including the compositional safety margin, the reflectivity does not show any significant change and it is possible to obtain a highly sensitive optical information recording medium.

Ti is selected as an additive for a ninth embodiment of the invention. In an experiment, an environment test was conducted on samples of optical disk medium of this embodiment prepared with varying the Ti content ratio within a range between 0 at. % and 15 at. %. In the environment test, each sample was held in a thermo-hygro-regulator tank of 80° C. and 90% humidity ratio for 3,000 hours and subsequently, the sample was taken out and the change in the reflectivity before and after the environment test was observed (ΔR (%)=reflectivity before the test—reflectivity after the test). Table 4 below shows the relationship between the content ratio "x" (at. %) of the auxiliary ingredient and ΔR (%) when the auxiliary ingredient is Ti.

TABLE 4

| Ti content ratio: x | 0 | 0.3 | 0.4 | 0.5 | 1 | 5 | 10 | 11 | 12 | 15 |
|---|---|---|---|---|---|---|---|---|---|---|
| Si(100 − x) | 0.3 | 0.1 | 0 | 0 | 0 | 0 | 0 | 0 | 0 | 0 |
| Al(100 − x) | 0.4 | 0.2 | 0 | 0 | 0 | 0 | 0 | 0 | 0 | 0 |
| AlSi(100 − x) | 0.5 | 0.3 | 0 | 0 | 0 | 0 | 0 | 0 | 0 | 0 |

Table 5 below shows the relationship between the recording sensitivity (recording power (mW)) and the content ratio "x" (at. %) of the auxiliary ingredient of samples of optical disk medium of this embodiment prepared with varying the Ti content ratio within a range between 0 at. % and 15 at. %.

TABLE 5

| Ti content ratio: x | 0 | 0.3 | 0.4 | 0.5 | 1 | 5 | 10 | 11 | 12 | 15 |
|---|---|---|---|---|---|---|---|---|---|---|
| Si(100 − x) | 5.4 | 5.4 | 5.5 | 5.5 | 5.6 | 5.6 | 5.7 | 5.7 | 6.3 | 7.2 |
| Al(100 − x) | 5.5 | 5.5 | 5.5 | 5.6 | 5.6 | 5.6 | 5.8 | 5.9 | 6.5 | 7.8 |
| AlSi(100 − x) | 5.4 | 5.4 | 5.5 | 5.5 | 5.6 | 5.6 | 5.7 | 5.8 | 6.4 | 7.6 |

It will be seen from Tables 4 and 5 that the effect of adding Ti to the Si, Al or AlSi target is remarkable when the content ratio of Ti is found within a range between 0.15 at. % and 11 at. %. More particularly, when the content ratio of Ti is found within a range between 0.2 at. % and 10 at. % including the compositional safety margin. Then, the reflectivity does not show any significant change and it is possible to obtain a highly sensitive optical information recording medium.

Cr is selected as an additive for a tenth embodiment of the invention. In an experiment, an environment test was conducted on samples of optical disk medium of this embodiment prepared with varying the Cr content ratio within a range between 0 at. % and 15 at. %, In the environment test, each sample was held in a thermo-hygro-regulator tank of 80° C. and 90% humidity ratio for 3,000 hours and subsequently, the sample was taken out and the change in the reflectivity before and after the environment test was observed (ΔR (%)=reflectivity before the test–reflectivity after the test). Table 6 below shows the relationship between the content ratio "x" (at. %) of the auxiliary ingredient and ΔR (%) when the auxiliary ingredient is Cr.

TABLE 6

| Cr content ratio: x | 0 | 0.3 | 0.4 | 0.5 | 1 | 5 | 10 | 11 | 12 | 15 |
|---|---|---|---|---|---|---|---|---|---|---|
| Si(100 − x) | 0.3 | 0.2 | 0 | 0 | 0 | 0 | 0 | 0 | 0 | 0 |
| Al(100 − x) | 0.4 | 0.2 | 0 | 0 | 0 | 0 | 0 | 0 | 0 | 0 |
| AlSi(100 − x) | 0.5 | 0.3 | 0 | 0 | 0 | 0 | 0 | 0 | 0 | 0 |

Table 7 below shows the relationship between the recording sensitivity and the auxiliary ingredient of samples of optical disk medium of this embodiment prepared with varying the Cr content ratio within a range between 0 at. % and 15 at. %. More specifically, Table 7 shows the relationship between the content ratio of the auxiliary ingredient and the optimal recording power when the auxiliary ingredient is Cr. The unit of the recording power is mW.

TABLE 7

| Cr content ratio: x | 0 | 0.3 | 0.4 | 0.5 | 1 | 5 | 10 | 11 | 12 | 15 |
|---|---|---|---|---|---|---|---|---|---|---|
| Si(100 − x) | 5.4 | 5.4 | 5.4 | 5.4 | 5.4 | 5.4 | 5.5 | 5.7 | 6.1 | 6.8 |
| Al(100 − x) | 5.5 | 5.5 | 5.5 | 5.5 | 5.6 | 5.6 | 5.7 | 5.9 | 6.2 | 6.8 |
| AlSi(100 − x) | 5.4 | 5.4 | 5.4 | 5.4 | 5.5 | 5.5 | 5.6 | 5.8 | 6.3 | 7.0 |

It will be seen from Tables 6 and 7 that the effect of adding Cr to the Si, Al or AlSi target is remarkable when the content ratio of Cr is found within a range between 0.15 at. % and 11 at. %. More particularly, when the content ratio of Cr is found within a range between 0.2 at. % and 10 at. % including the compositional safety margin. Then, the reflectivity does not show any significant change and it is possible to obtain a highly sensitive optical information recording medium.

The effects of using Co, Ta, C and Cu as auxiliary ingredient were also tested as in the case of the eighth through tenth embodiments. As a result, it was found that each of these elements is effective when it is added to a target containing Si, Al or AlSi as principal ingredient and content ratio of the element is within a range between 0.15 at. % and 11 at. %. Preferably, the content ratio of the auxiliary element is within a range between 0.2 at. % and 10 at. %. Then, it is possible to design an optical information recording medium that is highly sensitive and free from changes in the reflectivity with a relatively wide margin for the film thickness.

From above, it is clear that, when adding Ni, Ti, Cr, Co, Ta, C or Cu to a target of Si, Al or AlSi, the content ratio thereof is preferably within a range between 0.2 at. % and 10 at. %.

When the content ratio of the auxiliary ingredient in the eighth through tenth embodiment is 0 at. %, the dielectric layer 3 is equivalent to the Si type oxide/nitride dielectric layer (SiON film) of the above cited Proceedings of the 15$^{th}$ Symposium on Phase Change Optical Information Storage PCOS2003, pp. 56-61 (2003). In other words, when the target does not contain any auxiliary ingredient, the obtained information recording medium shows a remarkable change in the reflectivity before and after an environment test so that the characteristics of the recording medium changes with time when it is used for a long period of time.

While the so-called substrate-incident type optical information recording medium is described in each of the first through tenth embodiment, similar effects are obtained when an Si type oxide/nitride dielectric layer, an Al type oxide/nitride dielectric layer or an AlSi type oxide/nitride dielectric layer is used in a so-called film-layer-incident type optical information recording medium where the layers are arranged inversely relative to the substrate-incident type optical information recording medium. Embodiments of the latter type will be described below by referring to the related drawings.

Figure 12:
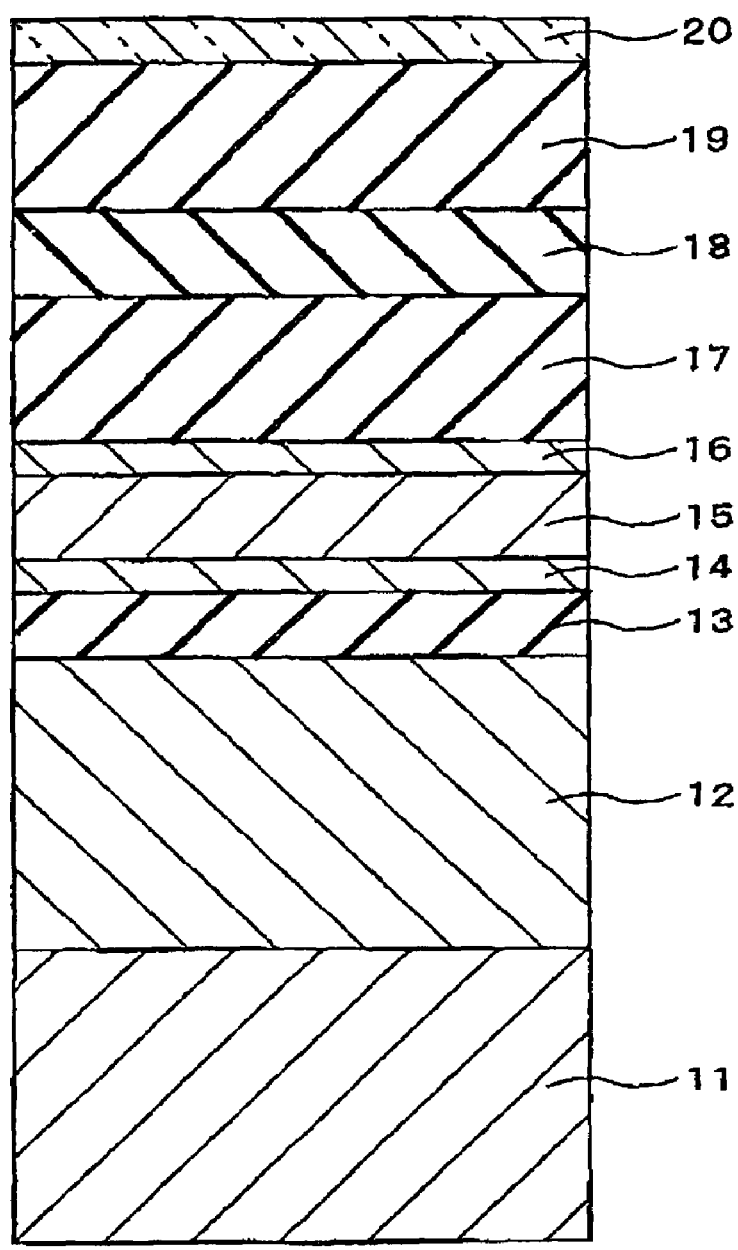
FIG. 12 is a schematic cross sectional view of an optical disk in accordance with the eleventh embodiment of the invention.

FIG. 12 is a schematic cross sectional view of an eleventh embodiment of optical information recording medium, which is of the film-layer-incident type. A silicon-nickel oxide/nitride film (SiNiON) is used for the oxide/nitride dielectric layer of this embodiment. As shown in FIG. 12, a reflection layer 12, a first dielectric layer 13, a first interface layer 14, an information recording layer 15, a second interface layer 16, a second dielectric layer 17, an oxide/nitride dielectric layer 18 and a third dielectric layer 19 are laid sequentially on a substrate 11 in the above mentioned order. A thin transparent film 20 is bonded onto the third dielectric layer 19 and a laser beam is made to enter the optical information recording medium from the side of the transparent film 20 for information recording/reproduction.

The substrate 11 is typically made of plastic, resin or glass and 1.1 mm thick, for example. Unlike the substrate of a substrate-incident type recording medium, the substrate 11 may not necessarily be transparent because the laser beam does not enter the recording medium from the side of the substrate 11. Meandering lands and grooves are formed alternately on the transparent substrate 11 substantially at identical cycles to produce recording tracks. Additionally, wobble modulation type format-modulated sections are formed on the substrate 11 by modulating the meanders of the grooves of the recording tracks. The format-modulated sections of adjacent recording tracks are arranged so as not to interfere with each other in radial directions.

The first dielectric layer 13, the second dielectric layer 17 and the third dielectric layer 19 are typically made of ZnS—SiO$_2$. The oxide/nitride dielectric layer 18 is typically made of silicon-nickel oxide/nitride (SiNiON). The silicon-nickel oxide/nitride film of the oxide/nitride dielectric layer 18 is formed by reactive sputtering and its oxygen concentration is typically between 39 and 67.5 at. %. Typically, the first interface layer 14 and the second interface layer 16 are made of GeN and the information recording layer 15 is made of Ge$_2$Sb$_2$Te$_5$. The reflection layer 12 is typically made of AlTi. The thin and transparent film 20 bonded onto the third dielectric layer 19 is made of polycarbonate (PC) and typically has a thickness of 0.1 mm.

The light absorption coefficient Aa of the recording layer 15 in the amorphous state is lower than the light absorption coefficient Ac in the crystalline state. The following values are selected for the refractive indexes of the layers in order to realize Aa<Ac. The refractive index of the thin and transparent film 20 is generally between 1.5 and 1.6. Thus, the refractive index of the third dielectric layer 19 has to be made higher than that of the thin and transparent film 20 because the third dielectric layer 19 and the thin and transparent film 20 are optically equivalent and the above requirement of Aa<Ac is not satisfied if the refractive index n19 of the third dielectric layer 19 is substantially equal to the refractive index n20 of the thin and transparent film 20. Additionally, the third dielectric layer 19 needs to adhere well to the thin and transparent film 20. Taking these into consideration, the third dielectric layer 19, the second dielectric layer 17 and the first dielectric layer 13 are made of ZnS—SiO$_2$. The refractive index of ZnS—SiO$_2$ is about 2.35.

The silicon-nickel oxide/nitride film of the oxide/nitride dielectric layer 18 is approximately between 1.43 and 1.8. Thus, the refractive index n18 of the oxide/nitride dielectric layer 18 and the refractive index n17 of the second dielectric layer 17 show a relationship of n18<n17, while the refractive index n19 of the third dielectric layer 19 and the refractive index n18 of the oxide/nitride dielectric layer 18 shows a relationship of n19>n18. Thus, it is possible to make the light absorption coefficient Aa of the recording layer 15 in the amorphous state lower than the light absorption coefficient Ac in the crystalline state.

The oxygen concentration and the content ratio of Ni of the silicon-nickel oxide/nitride film of the oxide/nitride dielectric layer 18 are found within ranges the same as the corresponding ranges described above for the first through tenth embodiment. This is because the eleventh embodiment differs from the preceding embodiments only in terms of the order in which the film layers are arranged or in that the former is of the cover-layer-incident type and the latter is of the substrate-incident type and the role that each of the films takes does not differ from its counterpart.

In other words, while silicon-nickel oxide/nitride (SiNiON) is used for the oxide/nitride dielectric layer 18 of the eleventh embodiment, the oxide/nitride dielectric layer 18 of the eleventh embodiment may alternatively be made of any other substance described above for the oxide/nitride dielectric layer 3 of the first through tenth embodiment to provide similar advantages.

The composition of each of the layers, the number of layers that constitute each of the layers and the method of forming the layers including the first dielectric layer 2, the second dielectric layer 4, the first interface layer 5, the recording layer 6, the second interface layer 7 and the third dielectric layer 8 of the first through tenth embodiments and those of the layers including the first dielectric layer 13, the second dielectric layer 17, the first interface layer 14, the recording layer 15, the second interface layer 16 and the third dielectric layer 19 of the eleventh embodiment are not limited to those described above and may be modified appropriately to provide advantages similar to those of the above-described first through eleventh embodiments depending on the recording/reproduction characteristics and the applications required for them.

The material and the thickness of the transparent substrate 1 and those of the thin and transparent film 20 are not limited to those described above and may be modified appropriately whenever necessary. A recording medium including such a modified transparent substrate 1 or a modified thin and transparent film 20 also provides advantages similar to those of the above described first through eleventh embodiments.

Additionally, while the pressure of the environmental gas to be used for reactive sputtering for the purpose of forming the silicon-nickel oxide/nitride film, the aluminum-nickel oxide/nitride film or the aluminum-silicon-nickel oxide/nitride film in each of the above described fourth through eleventh embodiments is 0.2 Pa, it has been found that any gas pressure within a range between 0.09 and 0.5 Pa may be used for forming the silicon-nickel oxide/nitride film, the aluminum-nickel oxide/nitride film and the aluminum-silicon-nickel oxide/nitride film showing the refractive index and the film forming rate similar to the refractive index and the film forming rate described above by referring to the first through eleventh embodiments when the above described content ratios are used for Ar gas, $O_2$ gas and $N_2$ gas. Then, the obtained information recording medium provides advantages similar to those of the first through eleventh embodiments.

Still additionally, while the target made of silicon ($Si_{99}Ni_1$ (at. %)), aluminum ($Al_{99}Ni_1$ (at. %)) or AlSi (($AlSi)_{99}Ni_1$ (at. %)) is used for reactive sputtering for forming the film for the oxide/nitride dielectric layer 3 of each of the fourth through tenth embodiments and for the oxide/nitride dielectric layer 18 of the eleventh embodiment, the present invention is by no means limited thereto. For example, it has been found that a target made of SiNiO, AlNiO or SiAlNiO may be used for reactive sputtering in a mixed gas atmosphere containing rare gas such as Ar gas, oxygen gas and nitrogen gas to provide advantages similar to those of the fourth through eleventh embodiments.

Finally, the inline type film forming system is used for forming the thin films of the information recording medium in the above description of the fourth through eleventh embodiments, a sheet type film forming system adapted to treat substrates on a one-by-one basis may alternatively be used to provide similar advantages.

What is claimed is:

1. An optical information recording medium comprising:
   a substrate;
   an oxynitride dielectric layer and an information recording layer overlying the substrate,
   a first dielectric layer formed overlying the information recording layer; and
   at least one reflection layer formed overlying the first dielectric layer,
   the reflection layer being adapted to reflect light irradiated from outside and transmitted through the substrate, the oxide/nitride dielectric layer, the information recording layer and the first dielectric layer toward the information recording layer,
   the oxynitride dielectric layer being made of an Si-based oxynitride containing Si as a principal ingredient and at least one element selected from the group consisting of Ni, Ti, Cr, Co, Ta, Cu and C as an auxiliary ingredient added to the principal ingredient,
   wherein the oxynitride dielectric layer has a refractive index from 1.43 to 1.8.

2. The recording medium according to claim 1, wherein the Si-based oxynitride contains oxygen by 39 to 67.5 at. %.

3. An optical information recording medium comprising:
   a substrate;
   an oxynitride dielectric layer and an information recording layer overlying the substrate,
   a first dielectric layer formed overlying the information recording layer; and
   at least one reflection layer formed overlying the first dielectric layer,
   the reflection layer being adapted to reflect light irradiated from outside and transmitted through the substrate, the oxynitride dielectric layer, the information recording layer and the first dielectric layer toward the information recording layer,
   the oxynitride dielectric layer being made of an Al-based oxynitride containing Al as a principal ingredient and at least one element selected from the group consisting of Ni, Ti, Cr, Co, Ta, Cu and C as an auxiliary ingredient added to the principal ingredient,
   wherein the oxynitride dielectric layer has a refractive index from 1.5 to 1.8.

4. The recording medium according to claim 3, wherein the Al-based oxynitride contains oxygen by 35 to 67.5 at. %.

5. An optical information recording medium comprising:
   a substrate;
   an oxynitride dielectric layer and an information recording layer overlying the substrate,
   a first dielectric layer formed overlying the information recording layer; and
   at least one reflection layer formed overlying the first dielectric layer,
   the reflection layer being adapted to reflect light irradiated from outside and transmitted through the substrate, the oxynitride dielectric layer, the information recording layer and the first dielectric layer toward the information recording layer,
   the oxynitride dielectric layer being made of an AlSi-based oxynitride containing AlSi as a principal ingredient and at least one element selected from the group consisting of Ni, Ti, Cr, Co, Ta, Cu and C as an auxiliary ingredient added to the principal ingredient,
   wherein the oxynitride dielectric layer has a refractive index from 1.43 to 1.8.

6. The recording medium according to claim 5, wherein the AlSi-based oxynitride contains oxygen by 39 to 67.5 at. %.

7. The recording medium according to any one of claims 1, 3 and 5, wherein a content ratio of the at least one element selected from the group consisting of Ni, Ti, Cr, Co, Ta, Cu and C is from 0.2 to 10 at. %.

8. The recording medium according to any one of claims 1, 3 and 5, wherein the information recording layer is arranged overlying the oxynitride dielectric layer, further comprising a second dielectric layer formed between the substrate and the oxynitride dielectric layer and a third dielectric layer formed between the oxynitride dielectric layer and the information recording layer, the second dielectric layer and the third dielectric layer have refractive indexes greater than that of the oxynitride dielectric layer.

9. The recording medium according to any one of claims 1, 3 and 5, further comprising:
   at least one second dielectric layer and at least one third dielectric layer,
   the oxynitride dielectric layer being arranged overlying the information recording layer,
   the third dielectric layer, the oxynitride dielectric layer and the first dielectric layer being formed in this order.

10. A method of manufacturing an optical information recording medium comprising the steps of forming an oxynitride dielectric layer overlying a substrate by reactive sputtering in a mixed gas atmosphere containing argon gas, oxygen gas and nitrogen gas;

forming thereon an information recording layer;

forming at least one first dielectric layer overlying the information recording layer; and forming a reflection layer overlying the first dielectric layer, the reactive sputtering employing a target made of an Si-based oxynitride containing Si as a principal ingredient and at least one element selected from the group consisting of Ni, Ti, Cr, Co, Ta, Cu and C as an auxiliary ingredient added to the principal ingredient, wherein the element selected from the group consisting of Ni, Ti, Cr, Co, Ta, Cu and C has a content ratio between 0.2 at. % and 10 at. %.

11. A method of manufacturing an optical information recording medium comprising the steps of:

forming an oxynitride dielectric layer on a substrate by reactive sputtering in a mixed gas atmosphere containing argon gas, oxygen gas and nitrogen gas;

forming an information recording layer;

forming at least one first dielectric layer overlying the information recording layer; and forming a reflection layer overlying the first dielectric layer, the reactive sputtering employing a target made of an Al-based oxynitride containing Al as a principal ingredient and at least one element selected from the group consisting of Ni, Ti, Cr, Co, Ta, Cu and C as an auxiliary ingredient added to the principal ingredient, wherein the element selected from the group consisting of Ni, Ti, Cr, Co, Ta, Cu and C has a content ratio between 0.2 at. % and 10 at. %.

12. A method of manufacturing an optical information recording medium comprising the steps of:

forming an oxynitride dielectric layer on a substrate by reactive sputtering in a mixed gas atmosphere containing argon gas, oxygen gas and nitrogen gas;

forming an information recording layer;

forming at least one first dielectric layer overlying the information recording layer; and forming a reflection layer overlying the first dielectric layer, the reactive sputtering employing a target made of an AlSi-based oxynitride containing Al and Si as principal ingredients and at least one element selected from the group consisting of Ni, Ti, Cr, Co, Ta, Cu and C as an auxiliary ingredient added to the principal ingredients, wherein the element selected from the group consisting of Ni, Ti, Cr, Co, Ta, Cu and C has a content ratio between 0.2 at. % and 10 at. %.

13. The method according to any one of claims 10 through 12, wherein the mixed gas has a composition within a hexagon defined by (90, 9, 1) volume %, (80, 12, 8) volume %, (70, 12, 8) volume %, (70, 2, 28) volume %, (80, 3, 17) volume % and (90, 7, 3) volume % in terms of (Ar, $O_2$, $N_2$) volume %.

14. The method according to any one of claims 10 through 12, wherein the information recording layer, the first dielectric layer and the reflection layer are formed by sputtering.

15. The method according to any one of claims 10 through 12, further comprising the steps of:

forming a second dielectric layer between the substrate and the oxynitride dielectric layer; and forming a third dielectric layer between the oxynitride dielectric layer and the information recording layer.

16. The method according to claim 15, wherein the second dielectric layer, the third dielectric layer, the recording layer, the first dielectric layer and the reflection layer are formed by sputtering.

17. A method of manufacturing an optical information recording medium, comprising the steps of:

forming at least one reflection layer overlying a substrate;

forming at least one first dielectric layer overlying the reflection layer;

forming an information recording layer overlying the first dielectric layer;

forming at least one second dielectric layer overlying the information recording layer;

forming an oxynitride dielectric layer by reactive sputtering in a mixed gas atmosphere containing argon gas, oxygen gas and nitrogen gas; and forming at least one third dielectric layer, the reactive sputtering employing a target made of an Si-based oxynitride containing Si as a principal ingredient and at least one element selected from the group consisting of Ni, Ti, Cr, Co, Ta, Cu and C as an auxiliary ingredient added to the principal ingredient, wherein the element selected from the group consisting of Ni, Ti, Cr, Co, Ta, Cu and C has a content ratio between 0.2 at. % and 10 at. %.

18. A method of manufacturing an optical information recording medium, comprising the steps of:

forming at least one reflection layer overlying a substrate;

forming at least one first dielectric layer overlying the reflection layer;

forming an information recording layer overlying the first dielectric layer;

forming at least one second dielectric layer overlying the information recording layer;

forming an oxynitride dielectric layer by reactive sputtering in a mixed gas atmosphere containing argon gas, oxygen gas and nitrogen gas; and forming at least one third dielectric layer;

the reactive sputtering employing a target made of an Al-based oxynitride containing Al as a principal ingredient and at least one element selected from the group consisting of Ni, Ti, Cr, Co, Ta, Cu and C as an auxiliary ingredient added to the principal ingredient, wherein the element selected from the group consisting of Ni, Ti, Cr, Co, Ta, Cu and C has a content ratio between 0.2 at. % and 10 at. %.

19. A method of manufacturing an optical information recording medium, comprising the steps of:

forming at least one reflection layer overlying a substrate;

forming at least one first dielectric layer overlying the reflection layer;

forming an information recording layer overlying the first dielectric layer;

forming at least one second dielectric layer overlying the information recording layer;

forming an oxynitride dielectric layer by reactive sputtering in a mixed gas atmosphere containing argon gas, oxygen gas and nitrogen gas; and forming at least one third dielectric layer, the reactive sputtering employing a target made of an AlSi-based oxynitride containing Al and Si as principal ingredients and at least one element selected from the group consisting of Ni, Ti, Cr, Co, Ta, Cu and C as an auxiliary ingredient added to the principal ingredients, wherein the element selected from the group consisting of Ni, Ti, Cr, Co, Ta, Cu and C has a content ratio between 0.2 at. % and 10 at. %.

* * * * *